United States Patent [19]

Matsushita et al.

[11] Patent Number: 4,888,144
[45] Date of Patent: Dec. 19, 1989

[54] DRY-TYPE RUBBER PRESSING METHOD

[75] Inventors: Isao Matsushita, Hyogo; Hideo Iijima, Aichi, both of Japan

[73] Assignee: Inax Corporation, Aichi, Japan

[21] Appl. No.: 57,388

[22] Filed: Jun. 2, 1987

[30] Foreign Application Priority Data

Apr. 27, 1987 [JP] Japan .................. 62-104952
Apr. 27, 1987 [JP] Japan .................. 62-104953
Apr. 27, 1987 [JP] Japan .................. 62-104954

[51] Int. Cl.[4] .................. B29C 43/14; B28B 21/18
[52] U.S. Cl. .................. 264/120; 264/109; 264/314; 425/389; 425/405.1
[58] Field of Search .............. 264/120, 314, 315, 313, 264/102, 109, 123; 425/405 R, 405 H, DIG. 14, DIG. 44, 389

[56] References Cited

U.S. PATENT DOCUMENTS

| | | | |
|---|---|---|---|
| 2,838,796 | 6/1958 | Reed | 264/314 |
| 4,097,977 | 7/1978 | Pollner | 264/314 |
| 4,473,526 | 9/1984 | Buhler et al. | 264/120 |

Primary Examiner—Jan H. Silbaugh
Assistant Examiner—Mary Lynn Fertig
Attorney, Agent, or Firm—Wenderoth, Lind & Ponack

[57] ABSTRACT

Powder is filled in an axially elongate powder filling space defined in a flexible pressure tube, and the pressure-bearing surface of the flexible pressure tube is pressurized with a pressurizing fluid, from a wall portion of the pressure tube which corresponds to a localized region of the powder filling space progressively toward another wall portion of the pressure tube which corresponds to an end of the powder filling space, until the pressure-bearing surface of the pressure tube is pressurized in its entirety, thereby compacting the powder in the powder filling space. Therefore, air in the powder is progressively squeezed toward the end of the powder filling space where the air can be discharged. Thus, no air remains trapped in the powder, and a formed product is prevented from being damaged, which enables elongate products to be produced.

3 Claims, 26 Drawing Sheets

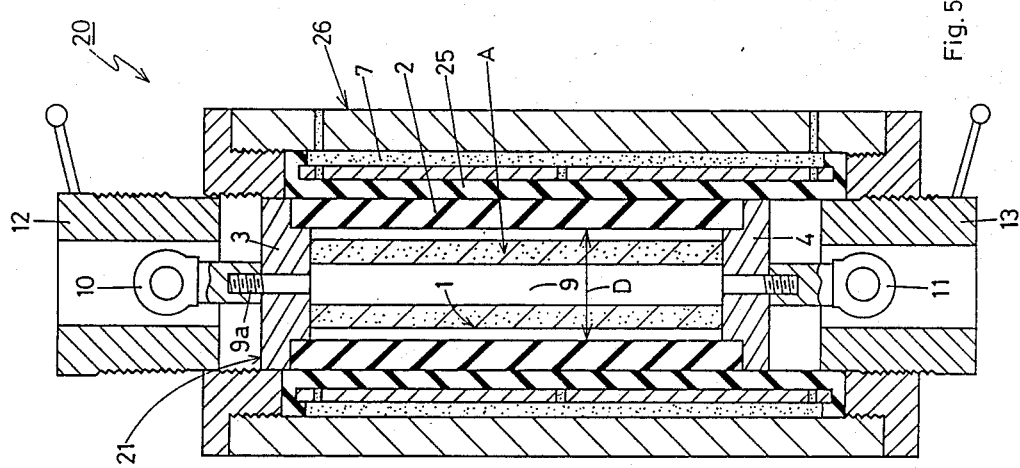
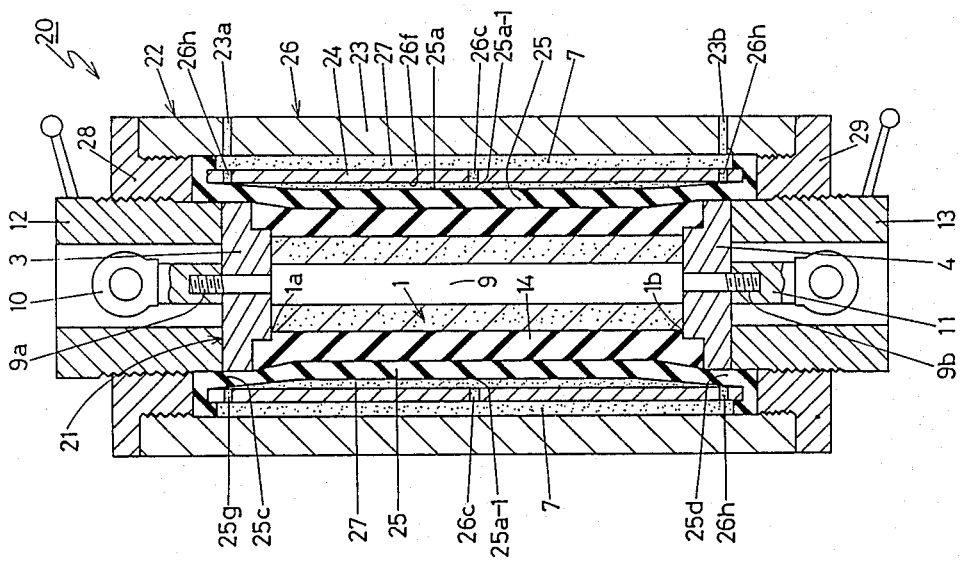

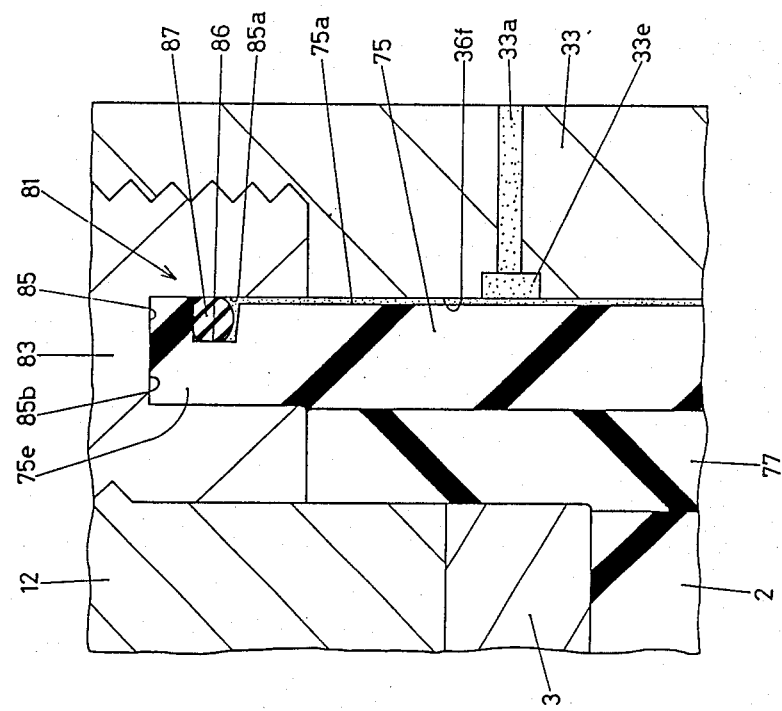
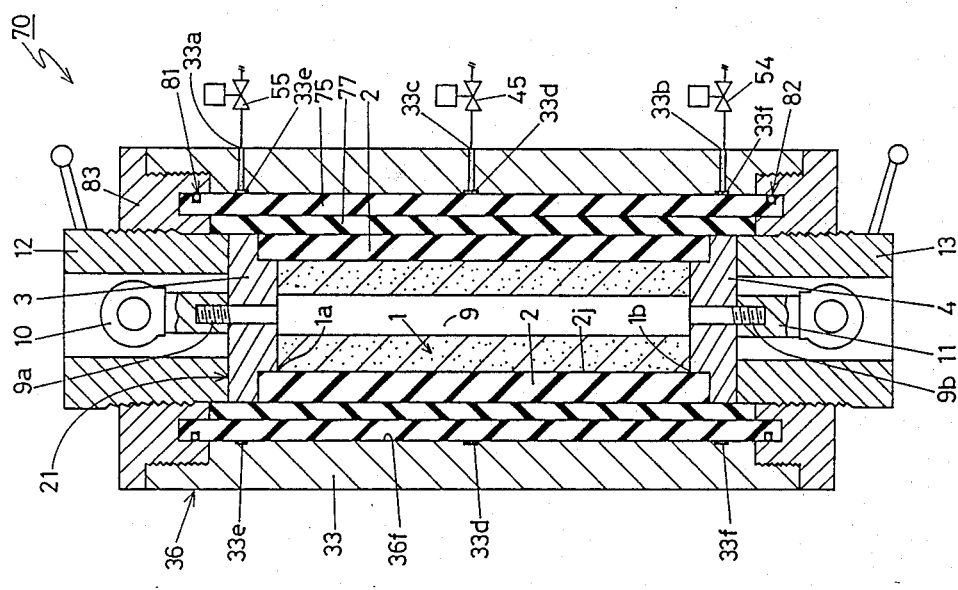
Fig 8
Fig. 7

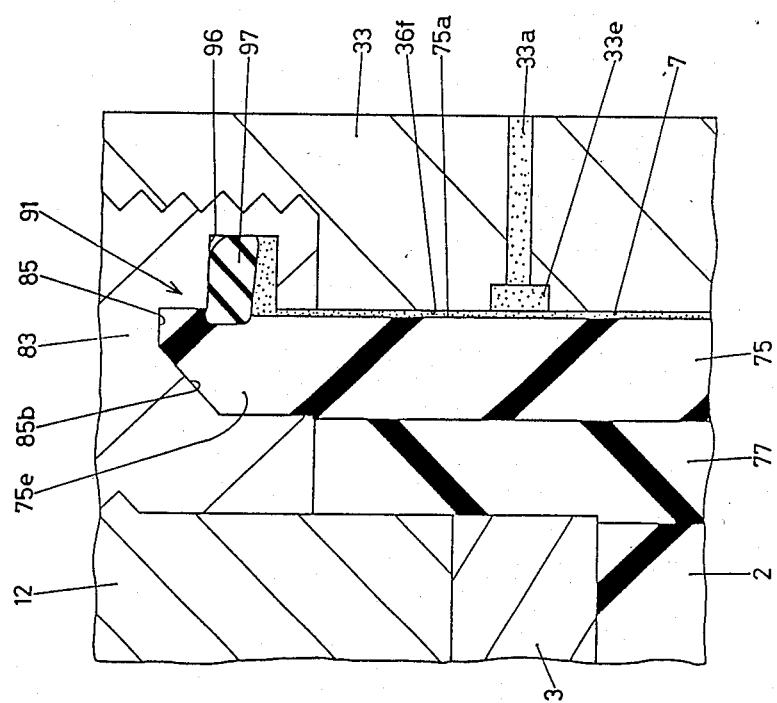
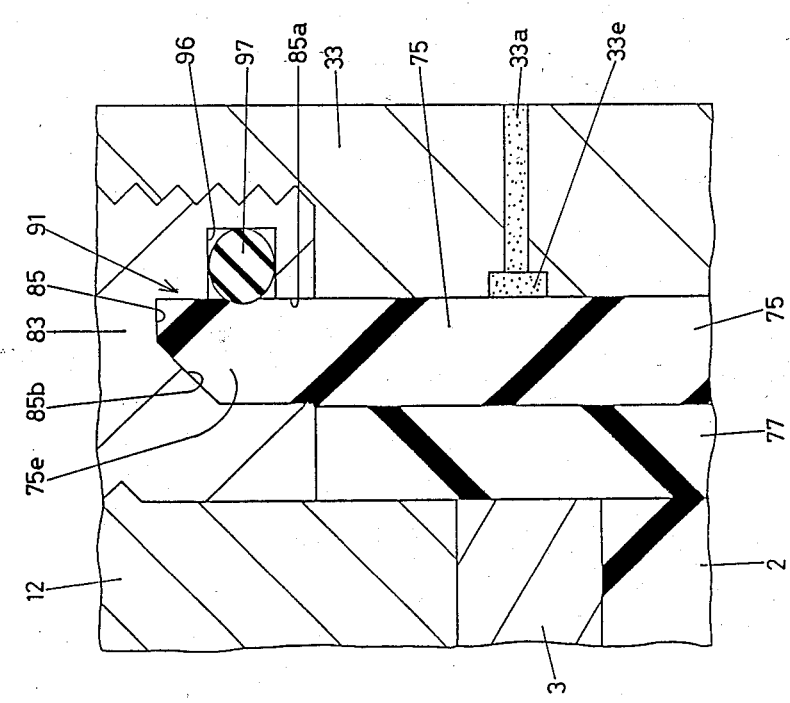
Fig. 9(A)
Fig. 9(B)

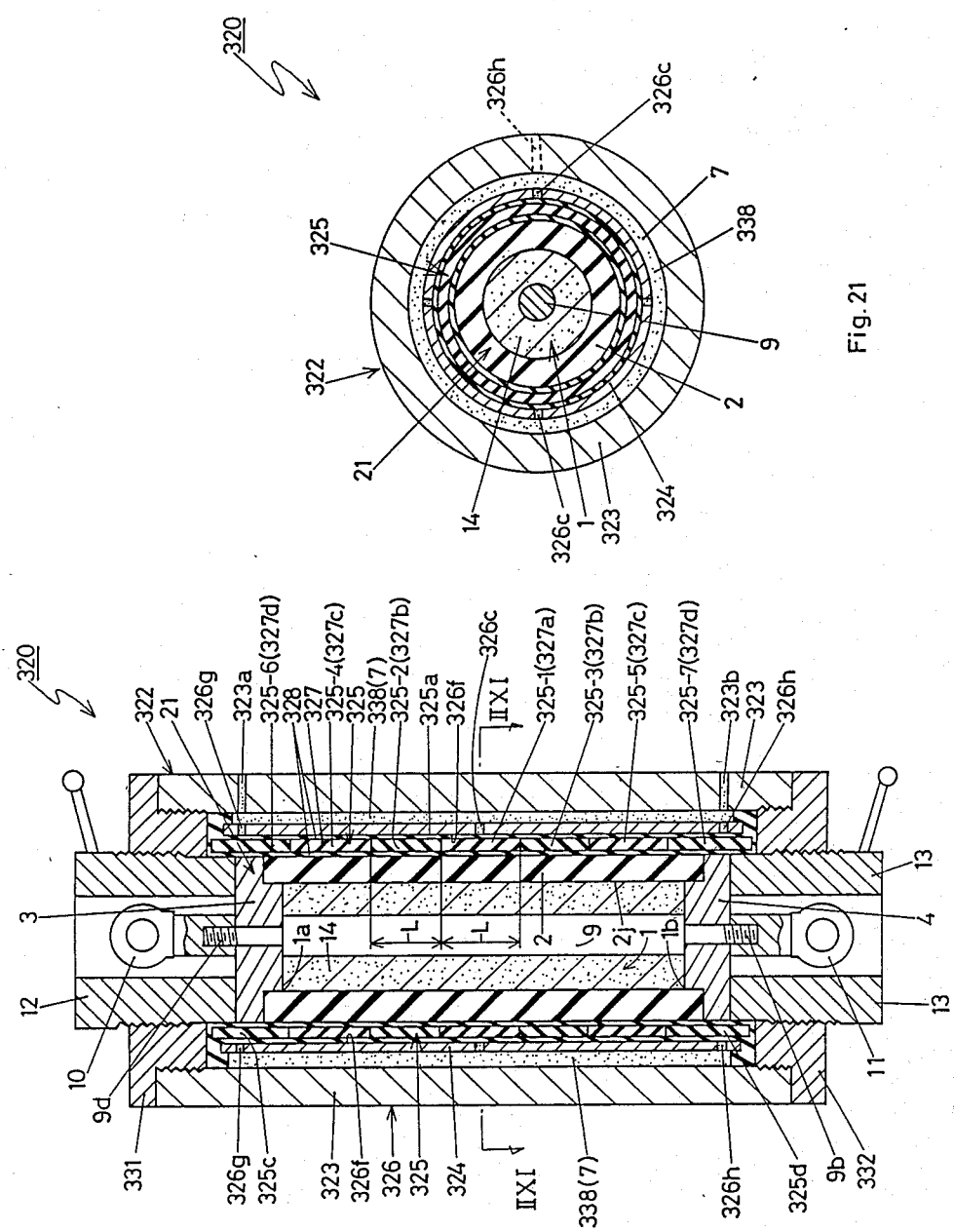

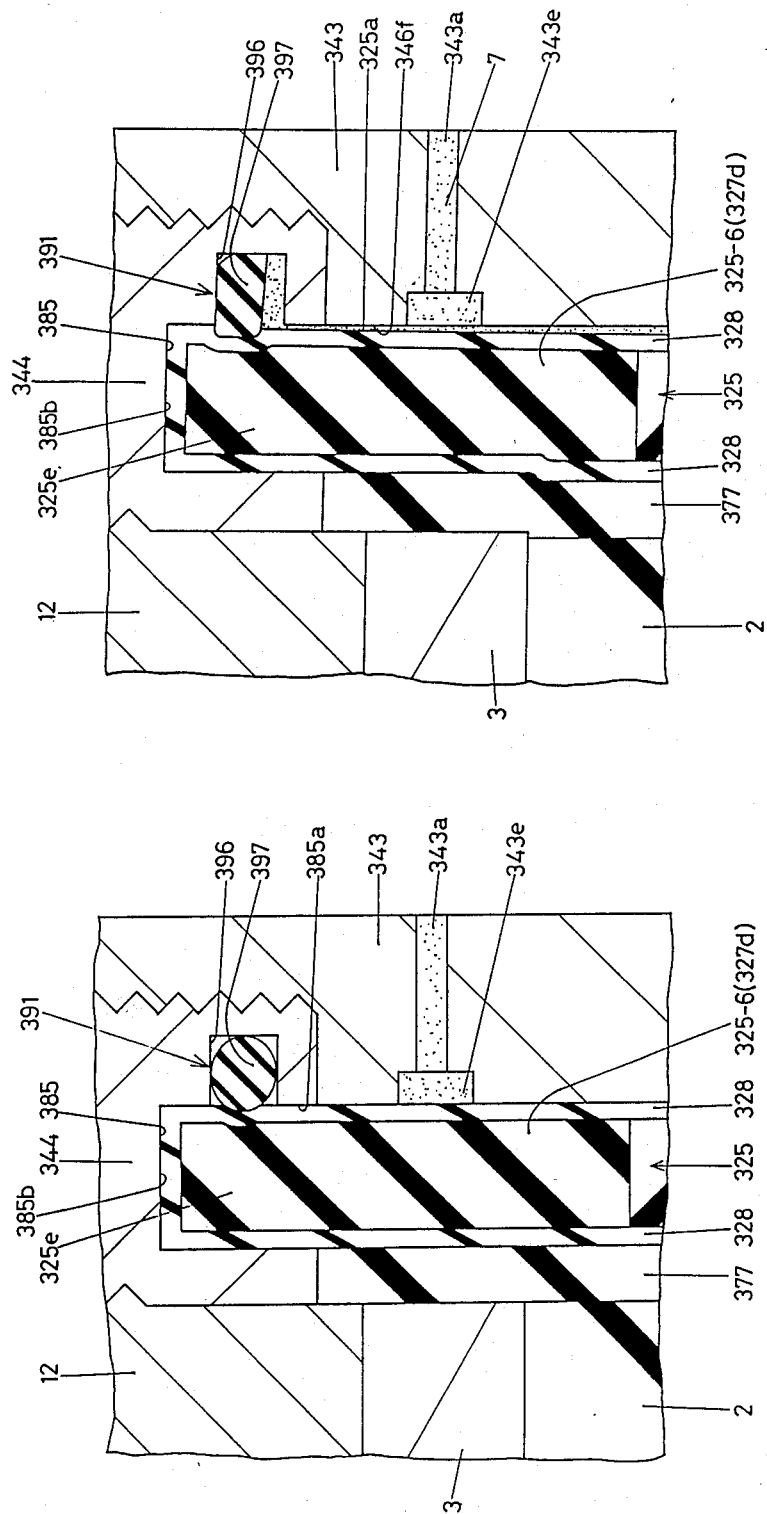

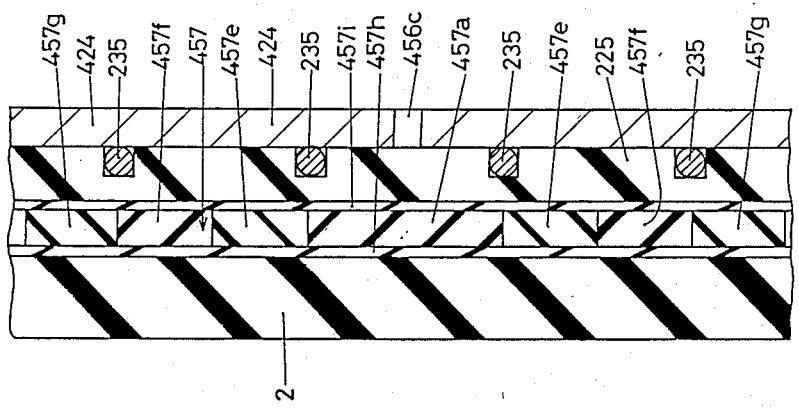
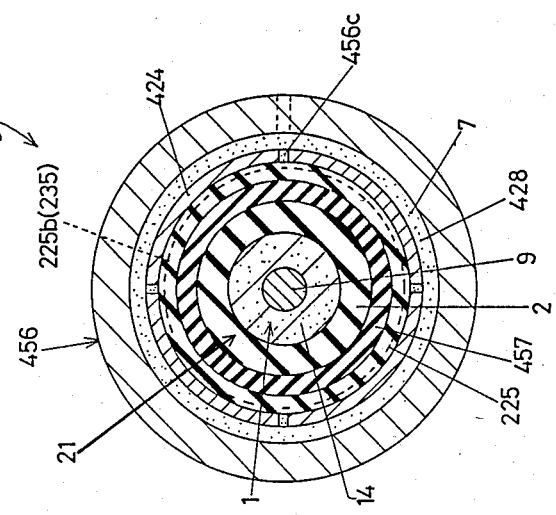
Fig. 31
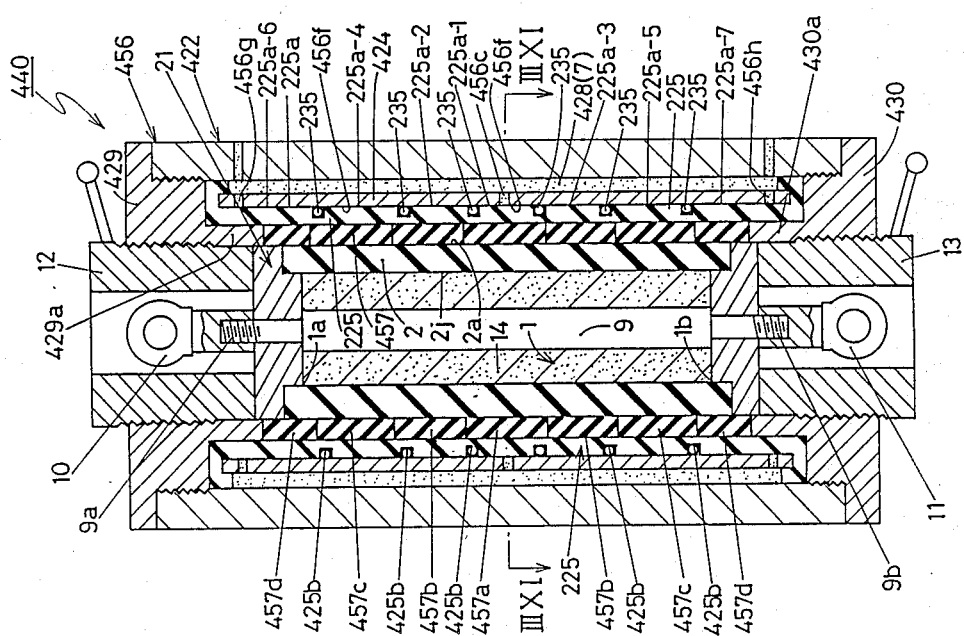
Fig. 30
Fig. 32

DRY-TYPE RUBBER PRESSING METHOD

BACKGROUND OF THE INVENTION

1. Field of the Invention

The present invention relates to a dry-type rubber pressing method and apparatus for forming powder into a product under hydrostatic pressure during a dry-type process while squeezing air in the powder into an area which does not adversely affect the formed product during the pressing process.

2. Prior Art

FIG. 41 of the accompanying drawings illustrates a conventional dry-type hydrostatic rubber pressing apparatus. The apparatus includes a mold 2 made of a flexible material such as neoprene rubber, urethane resin, or the like and defining therein an axially elongate powder filling space 1, a pair of lids 3, 4 covering the upper and lower open ends 1a, 1b of the powder filling space 1, a flexible pressure tube 5 fitted over the mold 2, and a retainer case 6 fitted over the pressure tube 5, with an annular pressure chamber 8 defined between the pressure tube 5 and the retainer case 6. The retainer case 6 has liquid supply and discharge ports 6c, 6d opening into the pressure chamber 8. The retainer case 6 has an axial through hole 6a extending vertically as shown, and the pressure tube 5 is disposed in the hole 6a. A core 9 is detachably disposed between the upper and lower lids 3, 4 and extends vertically and axially in the powder filling space 1. The core 9 has upper and lower bolt portions 9a, 9b extending through the lids 3, 4, respectively, with nuts 10, 11 tightened over the bolt portions 9a, 9b, respectively. The mold 2 covered with the upper and lower lids 3, 4 is inserted through the hole 6a into the pressure tube 5, and is retained in place by clamps 12, 13 threaded, respectively in upper and lower openings 6e, 6f defined in the retainer case 6.

The operation of the conventional dry-type rubber pressing apparatus thus constructed will be described below. The upper clamp 12 is detached from the retainer case 6, and the mold 2 is taken out of the retainer case 6. The upper nut 10 and the lid 3 are then removed from the mold 2, and the powder filling space 1 is filled with a mass of powder 14. Thereafter, the upper end of the powder filling space 1 filled with the powder 14 is closed by the lid 3, and the nut 10 is tightened over the bolt portion 9a of the core 9. The mold 2 is then inserted through the hole 6a into the pressure tube 5, the clamp 12 is then threaded to the retainer case 6 in opening 6e, whereupon the preparatory process is completed. Then, the pressure chamber 8 defined between the retainer case 6 and the pressure tube 5 is supplied with a liquid 7 under pressure through the liquid supply and discharge ports 6c, 6d. As the liquid 7 under pressure is supplied, the flexible pressure tube 5 is pressed against the substantially the entire outer surface 2a of the mold 2 simultaneously, although not specifically shown. Under the radially inward pressure from the pressure tube 5, the flexible mold 2 has its inside diameter D reduced to simultaneously pressurize the entire column of powder 14 in the powder filling space 1. The pressure of air present in the powder 14 is increased as the pressure of the liquid 7 increases. Therefore, the air passes through minute air passages between the powder particles toward the lids 3, 4, and is discharged through the thread gaps between the bolt portions 9a, 9b and the nuts 10, 11. After the pressurization is performed over a prescribed time, the pressure liquid 7 is discharged from the pressure chamber 8 through the liquid supply and discharge ports 6c, 6d. As the pressure of the liquid 7 is reduced, the flexible mold 2 and the pressure tube 5 resiliently return to their original shape until the original inside diameter D of the mold 2 is reached. Then, the upper clamp 12 is detached from the retainer case 6 and the mold 2 is removed from the retainer case 6. Finally, the formed product (not shown) in the mold 2 and the mold 2 and the core 9 are separated from each other.

As described above, the pressure of air in the powder 14 is increased as the pressure of the liquid 7 is increased, and the air flows through the air passages between the powder particles toward the lids 3, 4 and is discharged out through the gaps between the bolt portions 9a, 9b and the nuts 10, 11. In order to discharge the air in the powder 14 quickly, it is necessary that the air pressure be high and the air passages defined as continuous gaps between the powder particles be large. To increase the air pressure, the pressure of the liquid 7 should be increased. As the powder 14 is pressurized, however, the air passages defined as continuous gaps between the powder particles are greatly reduced or closed. Accordingly, increasing the air pressure and enlarging the air passages are contradictory to each other.

In the conventional dry-type rubber pressing method and apparatus, as the liquid 7 under pressure is supplied, the overall pressurizing region in the mold 2 is substantially simultaneously pressed to reduce the inside diameter D of the mold 2. As a consequence, the pressure of the air in the powder 14 is increased and at the same time the gaps between the powder particles are reduced or closed throughout the entire powder filling space 1. Therefore, the above contradictory problem cannot be resolved, and the following drawbacks are caused: Where the longitudinal dimension H of the powder filling space 1 is increased, the air compressed under high pressure in the powder 14 filled centrally in the powder filling space 1 cannot be removed completely since the distance to the air-discharging gaps defined between the bolt portions 9a, 9b and the nuts 10, 11 is large, with the result that compressed air remains trapped in the formed product. The air trapped in the formed product tends to be expanded to damage the product when the pressure of the liquid 7 is reduced. To prevent compressed air from remaining in the product, it has been necessary for the longitudinal dimension H of the powder filling space 1 in the conventional dry-type rubber pressing method and apparatus to be 500 mm or less. This is disadvantageous in that longer products cannot be produced.

SUMMARY OF THE INVENTION

In view of the aforesaid shortcomings of the conventional dry-type rubber pressing method and apparatus, it is an object of the present invention to provide a dry-type rubber pressing method and apparatus capable of producing elongate and high-quality molded products while preventing compressed air from being trapped therein.

According to the present invention, a flexible pressure tube with an axially elongate powder filling space defined therein is squeezed in a limited or localized region, and thereafter the squeezed region is progressively expanded toward a portion of the pressure tube which corresponds to an end of the powder filling space thereby pressurizing the entire pressure-bearing surface of the pressure tube.

During the pressing process, air in the powder in the powder filling space is squeezed into an area which does not adversely affect the formed product, so that no compressed air is trapped in the product.

With the present invention, elongate and high quality quality products which have conventionally been unable to be produced can be formed by performing the above processing steps.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a longitudinal cross-sectional view showing a final pressurizing state in the apparatus of FIG. 1;

FIG. 5 is a longitudinal cross-sectional view showing the manner in which a formed product is removed from the apparatus of FIG. 1;

FIG. 7 is a longitudinal cross-sectional view of a dry-type rubber pressing apparatus according to a third embodiment of the present invention;

FIG. 8 is an enlarged fragmentary cross-sectional view of a seal structure in a pressure tube in the apparatus of FIG. 7;

FIG. 9(A) is an enlarged fragmentary cross-sectional view of another seal structure while not pressurized;

FIG. 9(B) is a view similar to FIG. 9(A), showing the seal structure of FIG. 9(A) while pressurized;

FIG. 20 is a longitudinal cross-sectional view of a dry-type rubber pressing apparatus according to an eighth embodiment of the present invention;

FIG. 21 is a transverse cross-sectional view taken along line IIXI—IIXI of FIG. 20;

FIG. 27(A) is an enlarged fragmentary cross-sectional view of another seal structure while not pressurized;

FIG. 27(B) is a view similar to FIG. 27(A), showing the seal structure of FIG. 27(A) while pressurized;

FIG. 30 is a longitudinal cross-sectional view of a dry-type rubber pressing apparatus according to an eleventh embodiment of the present invention;

FIG. 31 is a transverse cross-sectional view taken along line IIIXI—IIIXI of FIG. 30;

FIG. 32 is an enlarged fragmentary longitudinal cross-sectional view showing another embodiment of a backup tube;

DESCRIPTION OF THE PREFERRED EMBODIMENTS

(1ST EMBODIMENT)

Figure 2:
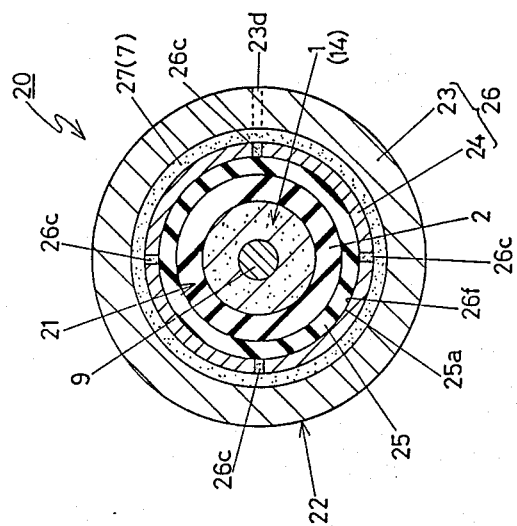
FIG. 2 is a transverse cross-sectional view taken along line II—II of FIG. 1.

FIGS. 1 through 5 show a dry-type rubber pressing apparatus according to a first embodiment of the present invention. The apparatus, generally designated by the reference numeral 20, essentially comprises a pressed assembly 21 and a pressing assembly 22.

The pressed assembly 21 is conventional and includes a flexible mold 2 defining therein a vertically elongate powder filling space 1, a pair of lids 3, 4 covering the upper and lower open ends 1a, 1b of the powder filling space 1, a core 9 extending between the upper and lower lids 3, 4, and nuts 10, 11 threaded respectively over bolt portions 9a, 9b of the core 9. The core 9 may be have a circular, elliptical, polygonal, or other suitable transverse cross-sectional shape, and one or more cores 9 may be employed. When a solid product is to be formed, the core 9 is not disposed in the mold 2.

The pressing assembly 22 of the apparatus 20 has an improved structure. The pressing assembly 22 includes a pressure tube 25 fitted in a retainer case 26. The retainer case 26 comprises a rigid outer tube 23, an inner tube 24 backing up the pressure tube 25, and a pair of upper and lower lids 28, 29 threaded over the upper and lower ends, respectively, of the outer tube 23 and sandwiching the pressure tube 25. An annular pressure chamber 27 is defined between the outer tube 23 and the inner tube 24. The pressure tube 25 is made of a flexible material such as neoprene rubber, urethane resin, or the like and has a rubber hardness in the range of 40 to 90 according to Japan Industrial Standard (JIS). The pressure tube 25 has an outer peripheral surface 25a serving as a pressure bearing surface for bearing the pressure extended by a pressurizing liquid 7. The outer peripheral surface 25a includes an initial pressurizing region 25a-1 remotest from the ends 1a, 1b of the powder filling space 1. The inner tube 24 has an inner liquid guide surface 26f held in intimate contact with the outer peripheral surface 25a of the pressure tube 25. The inner tube 24 has a plurality of radially extending liquid supply ports 26c (FIG. 2) open at the inner liquid guide surface 26f, confronting the initial pressurizing region 25a-1 and communicating with the pressure chamber 27. A suitable number of liquid supply and discharge ports 26g extend radially through the inner tube 24 adjacent the upper end of the liquid guide surface 26f and are communication with the pressure chamber 27, the liquid supply and discharge ports 26g being disposed in a radially confronting relation to the lid 3 through the pressure tube 25. A suitable number of liquid supply and discharge ports 26h also extend radially through the inner tube 24 adjacent the lower end of the liquid guide surface 26f and are in communication with the pressure chamber 27, the liquid supply and discharge ports 26h being disposed in a radially confronting relation to the lid 4 through the pressure tube 5. The upper and lower liquid supply and discharge ports 6g, 26h are provided to discharge air present between the liquid guide surface 26f and the pressure tube 25, and are normally closed off by the outer peripheral surface 25a of the pressure tube 25. Portions 25c, 25d of the pressure tube 25 which close the liquid supply and discharge ports 26g, 26h are radially backed by the lids 3, 4 of the pressed assembly 21, so that the liquid supply and discharge ports 26g, 26h remain closed until these portions 25c, 25d are flexibly deformed (FIG. 4). The outer tube 23 has liquid supply and discharge ports 23a, 23b defined in the vicinity of upper and lower ends thereof and are open to the pressure chamber 27. The liquid supply and discharge ports 23a, 23b are coupled to liquid supply and discharge pipes of a liquid supply and discharge system (not shown).

The initial pressurizing region 25a-1 of the outer peripheral surface 25a of the pressure tube 25 is not limited to the illustrated central position, but may be located at a suitable localized region between the upper and lower ends 25e, 25f of the pressure tube 25.

In the illustrated embodiment, the longitudinal axis of the powder filling space 1 is shown as extending vertically. However, the longitudinal axis of the powder filling space 1 may be inclined or horizontal.

Figure 1:
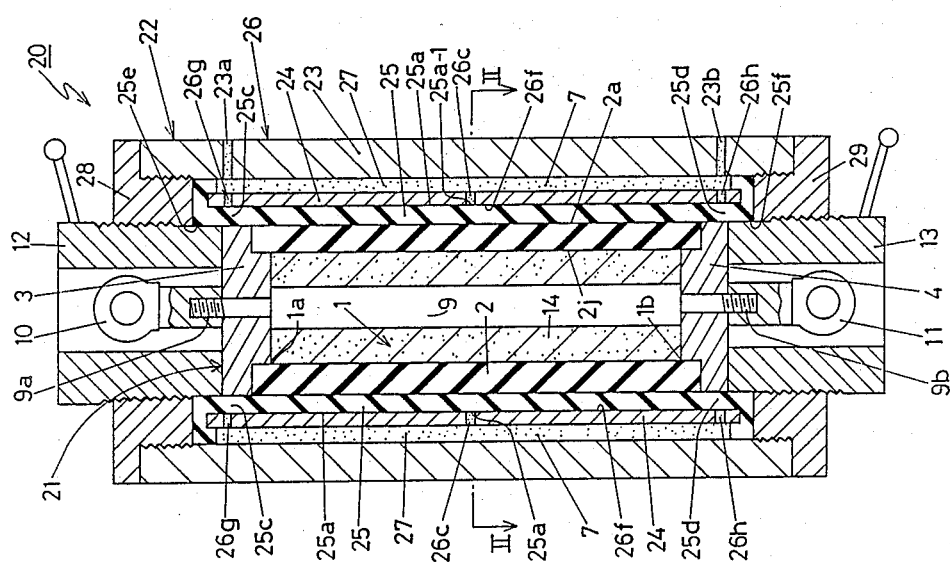
FIG. 1 is a longitudinal cross-sectional view of a dry-type rubber pressing apparatus according to a first embodiment of the present invention.
Figure 3A:
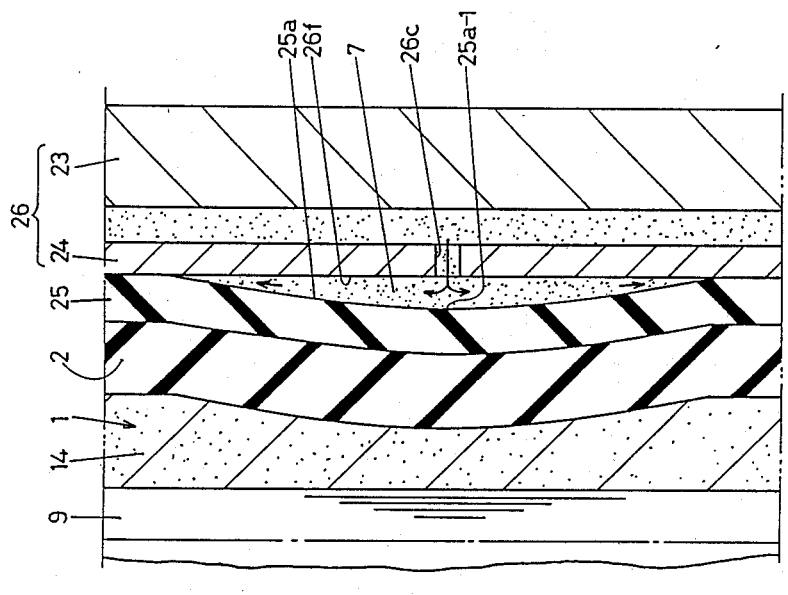
FIGS. 3(A) and 3(B) are enlarged fragmentary longitudinal cross-sectional views showing an initial pressurizing state in the apparatus of FIG. 1.
Figure 3B:
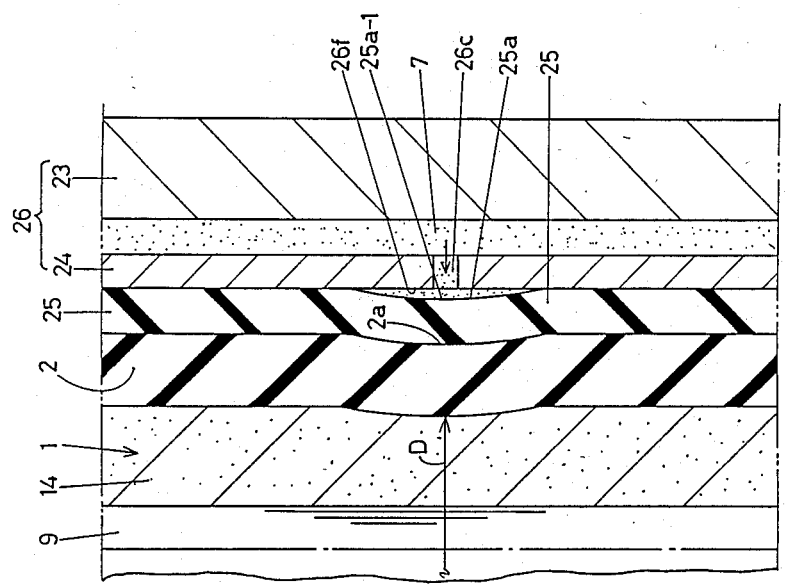

Operation of the apparatus 20, or the method of the present invention, will be described below. As shown in FIGS. 1 and 2, the pressed assembly 21 is provided with a mass of powder 14 in the powder filling space 1. The pressed assembly 21 is then inserted into the pressing assembly 22, and held in position by upper and lower clamps 12, 13 threaded in the pressing assembly 22. Then, a pressurizing liquid 7 (such as oil, glycerin, an aqueous solution of boric acid, or the like) which is supplied under pressure from the liquid supply and discharge system flows through the liquid supply and discharge ports 23a, 23b of the outer tube 23 into the pressure chamber 27. When the pressure of the liquid 7 in the pressure chamber 27 reaches a prescribed level (for example in the range of 50 to 200 kg/cm$^2$), the liquid 7 flows through the liquid supply ports 26c toward the pressure tube 25 and flows between the outer peripheral surface 25a of the pressure tube 25 and the liquid guide surface 26f. Since the liquid supply and discharge ports 26g, 26h defined adjacent to the upper and lower ends of the inner tube 24 are closed by the portions 25c, 25d of the pressure tube 25, the liquid 7 under pressure does not flow out past the pressure tube 25. As shown in FIG. 3(A), the liquid 7 when under low pressure is applied to the initial pressurizing region 25a-1 of the outer peripheral surface 25a a confronting the liquid supply and discharge port 26c and elastically expands the apparatus at the initial pressurizing region 25a-1 radially inwardly. The mold 2 is now pressed only at a portion of its outer peripheral surface 2a which faces the initial pressurizing region 25a-1, reducing the inside diameter D of the mold 2 to compact the powder 14. The pressure of air (not shown) in the pressurized powder 14 is increased and the air quickly flows into air passages defined by gaps between powder particles which are not compacted. Therefore, no air remains under compression in the pressurized powder 14. As the amount of supplied liquid 7 increases, it flows into successive pressurizing regions adjacent to the initial pressurizing region 25a-1 and progressively expands the apparatus at those successive pressurizing regions radially inwardly. The powder 14 filled in the powder filling space 1 is thus progressively compacted from the region in the powder filling space 1 which confronts the initial pressurizing region 25a-1 toward the ends 1a, 1b (see FIG. 1) of the powder filling space 1. As the powder 14 is axially progressively pressurized or compacted, air present in the powder 14 in the powder filling space 1 is squeezed from the region in the powder filling space 1 which confronts the initial pressurizing region 25a-1 toward the ends 1a, 1b of the powder filling space 1, and is finally discharged out of the powder filling space 1 through the thread gaps defined between the bolt portions 9a, 9b of the core 9 and the nuts 10, 11. As a consequence, air under compression which would damage a formed product A (FIG. 5) is prevented from being trapped in the compacted powder 14. The liquid 7 under pressure supplied between the entire outer peripheral surface 25a and the liquid guide surface 26f is pressurized up to a prescribed final pressure level (for example, in the range of 500 to 5,000 kg/cm$^2$), to compact the powder 14, as shown in FIG. 4. After the pressurization is performed over a prescribed period of time, the pressure of the liquid 7 in the pressure chamber 27 is reduced. As the pressure of the liquid 7 is lowered, the flexible mold 2 and the pressure tube 25 return to their original shape under their own resiliency until the original inside diameter D of the mold 2 is recovered, as shown in FIG. 5. After the upper clamp 12 has been detached from the retainer case 26, the pressed assembly 21 is pulled out of the retainer case 26. Then, the nuts 10, 11 and the lids 3, 4 are removed, and the formed product A, the core 9, and the mold 2 are separated from each other.

(2ND EMBODIMENT)

Figure 6:
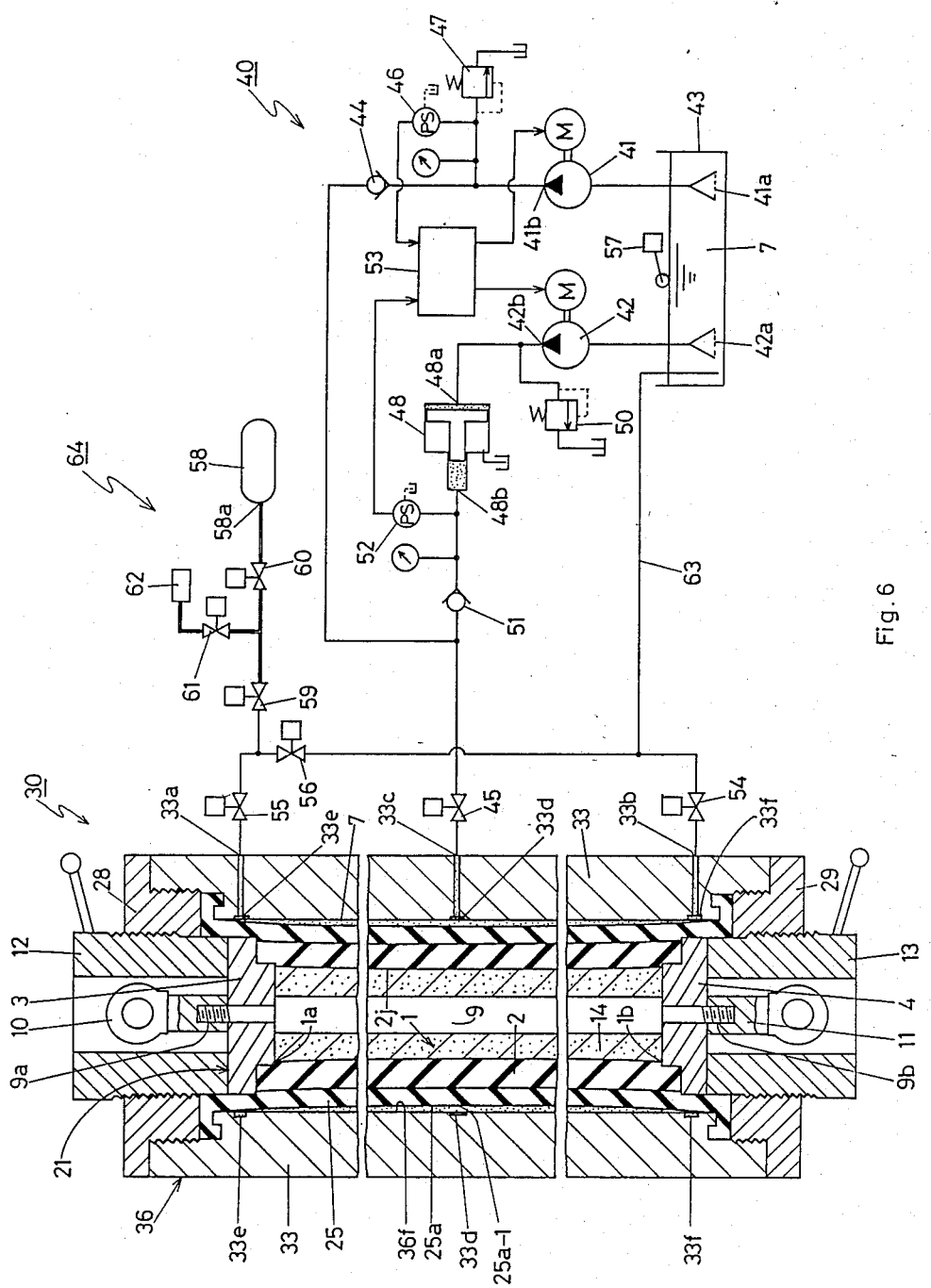
FIG. 6 is a fragmentary longitudinal cross-sectional view of a dry-type rubber pressing apparatus according to a second embodiment of the present invention, the view also illustrating a system for supplying and discharging a pressurizing liquid and a system for discharging a liquid.

FIG. 6 shows an apparatus 30 according to a second embodiment of the present invention. The apparatus 30 is significantly different from the apparatus 20 of the first embodiment in that a pressure tube 25 is fitted in a rigid outer tube 33 constituting a retainer case 36. The outer tube 33 has an inner peripheral liquid guide surface 36f facing the outer peripheral surface 25a of the pressure tube 25. The liquid guide surface 36f has defined therein an annular distribution groove 33d confronting the entire periphery of an initial pressurizing region 25a-1 of the pressure tube 25, an annular distribution groove 33e facing an upper portion of the outer peripheral surface 25a of the pressure tube 25, and an annular distribution groove 33f facing a lower portion of the outer peripheral surface 25a of the pressure tube 25. The distribution grooves 33d, 33e, 33f communicate, respectively, with liquid supply and discharge ports 33c, 33a, 33b defined in the outer tube 33.

A liquid supply and discharge system 40 for supplying and discharging a liquid 7 under pressure to and from the apparatus 30 will be described below. An initial pressurizing pump 41 and a boost pump 42 have inlet ports 41a, 42a positioned in an oil tank 43. The initial pressurizing pump 41 has an outlet port 41b coupled via a check valve 44 and a solenoid-operated valve 45 to the liquid supply and discharge port 33c of the outer tube 33. Coupled between the outlet port 41b and the check valve 44, are a pressure switch 46 and a relief valve 47. The boost pump 42 has an outlet port 42b coupled to an inlet port 48a of a boost cylinder 48 and a relief valve 50. The boost cylinder 48 has an outlet port 48b connected via a check valve 51 to the solenoid-operated valve 45. A pressure switch 52 is coupled between the outlet port 48b of the boost cylinder 48 and the check valve 51. The initial pressurizing pump 41 and the boost pump 42 are started and stopped by a control circuit 53. More specifically, the control circuit 53 operates the initial pressurizing pump 41 only until the pressure switch 46 produces a detected pressure setting signal indicative of an initial pressure setting. In response to a detected pressure setting signal from the pressure switch 46, the control circuit 53 stops the operation of the initial pressurizing pump 41, and starts the boost pump 42. The control circuit 53 also operates the boost pump 42 until the pressure switch 52 generates a detected pressure setting signal indicative of a high pressure setting. When the control circuit 53 receives a detected pressure setting signal from the pressure switch 52, the control circuit 53 stops the operation of the boost pump 42. A drain pipe 63 leading to the oil tank 43 is connected via a solenoid-operated valve 54 to the liquid supply and discharge port 33b of the outer tube 33 and also, via solenoid-operated valves 55, 56, to the liquid supply and discharge port 33a of the outer tube 33. The oil tank 43 is associated with a liquid level detector switch 57.

A liquid discharge system 64 serves to forcibly discharge the liquid 7 under pressure which remains between the liquid guide surface 36f of the outer tube 33 and the outer peripheral surface 25a of the pressure tube 25. The liquid discharge system 64 includes a compressed air source 58 having an outlet port 58a connected through solenoid-operated valves 59, 60 to a point between the solenoid-operated valves 55, 56. A muffler 62 is joined via a solenoid-operated valve 61 between the solenoid-operated valves 59, 60. The outlet port of the muffler 62 should preferably be connected to the oil tank 43 since it may discharge the liquid 7 under pressure.

Operation of the apparatus 30 according to the second embodiment will hereinafter be described with reference to operation of the liquid supply and discharge system 40 and the liquid discharge system 64. The pressed assembly 21 charged with the powder 14 is loaded into the outer tube 33. The liquid supply and discharge system 40 closes the solenoid-operated valves 54, 55, 56 and opens the solenoid-operated valve 45. The initial pressurizing pump 41 is started in response to an output signal from the control circuit 53 to supply the liquid 7 under pressure to the liquid supply and discharge port 33c of the outer tube 33. The liquid 7 under pressure flows between the outer peripheral surface 25a of the pressure tube 25 and the liquid guide surface 36f of the retainer case 36 to progressively compact the powder 14 filled in the powder filling space 1 so that the powder is progressively squeezed from the region of the powder filling space 1 confronting the initial pressurizing area 25a-1 of the pressure tube 25 to the ends 1a, 1b of the powder filling space 1. Air in the powder 14 is therefore progressively squeezed toward the ends 1a, 1b of the powder filling space 1. Upon the completion of the initial pressurization of the entire amount of powder 14, the pressure of the liquid 7 discharged from the initial pressurizing pump 41 is increased. In response to an increase in the liquid pressure from the initial pressurizing pump 41, the pressure switch 46 applies a detected pressure setting signal to the control circuit 53 to enable the same to stop the initial pressurizing pump 41 and start the boost pump 42. The boost pump 42 then supplies the liquid 7 under a high pressure (for example, ranging from 500 to 5,000 kg/cm$^2$) between the outer peripheral surface 25a of the pressure tube 25 and the liquid guide surface 36f of the retainer case 36 to compact the powder 14. When the high-pressure liquid 7 reaches a prescribed pressure level, the pressure switch 52 applies a detected pressure setting signal to the control circuit 53 which then deactivates the boost pump 42. When a given period of time elapses after the deactivation of the boost pump 42, the solenoid-operated valve 45 is closed, and the solenoid-operated valves 54, 55, 56 are opened. Most of the liquid 7 under pressure present between the outer peripheral surface 25a and the liquid guide surface 36f is now forced by elastic recovery of the pressure tube 25 and the mold 2 to flow through the drain pipe 63 back into the oil tank 43. The liquid level detector switch 57 in the oil tank 43 detects when the amount of the liquid 7 which has flowed back into the oil tank 43 has reached a prescribed level. A slight amount of the liquid 7 under pressure may remain between the outer peripheral surface 25a and the liquid guide surface 36f due, for example to the resistance of the drain pipe. When such residual liquid is left, it causes the pressure tube 25 to keep on pressing the mold 2, making it difficult to pull the mold 2 out of the pressure tube 25. The pressurizing liquid 7 is very likely to remain between the outer peripheral surface 25a and the liquid guide surface 36f when the axial length of the pressure tube 25 is large. The remaining liquid 7 can be forcibly discharged by the liquid discharge system 64.

The liquid discharge system 64 operates as follows: The solenoid-operated valves 59, 60, 61 are closed in advance. In response to a detected signal from the liquid level detector switch 57 in the oil tank 43, the solenoid-operated valve 56 is closed, and the solenoid-operated valves 59, 60 are opened. Air under pressure supplied from the compressed air source 58 flows through the solenoid-operated valves 60, 59, 55 and the liquid supply and discharge port 33a and between the outer peripheral surface 25a, and the liquid guide surface 36f to force out the remaining liquid 7. The liquid 7 is forced to quickly flow through the lower liquid supply and discharge port 33b, the solenoid-operated valve 54, and the drain pipe 63 into the oil tank 43. After the liquid 7 has returned to the oil tank 43, the solenoid-operated valve 60 is closed and the solenoid-operated valve 61 is opened to discharge air remaining between the outer peripheral surface 25a and the liquid guide surface 36f.

Upon the completion of the removal of any remaining liquid 7, the pressed assembly 21 is taken out of the pressure tube 25, after which the mold 2 and the molded product (not shown) are separated from each other.

(3RD EMBODIMENT)

FIGS. 7 and 8 show an apparatus 70 according to a third embodiment of the present invention. The apparatus 70 is different from the apparatus 30 of the second embodiment (FIG. 6) in that seal structures 81, 82 are provided near the upper and lower ends of a pressure tube 75, and a protective tube 77 is interposed between the pressure tube 75 and the mold 2.

As shown in FIG. 8, the seal structure 81 near the upper end of the pressure tube 75 includes an annular groove 85 defined in a lid 83. The pressure tube 75 has an upper edge 75e extending in the annular groove 85 and having an outer peripheral surface 75a with a seal ring groove 86 defined therein. A seal ring 87 fitted in the seal ring groove 86 is held in intimate contact with the inner peripheral surface 85a of the annular groove 85. The annular groove 85 has an innermost surface 85b serving as a backup portion for the upper edge 75e of the pressure tube 75. The cross section of the seal ring 87 is not limited to an O-shape, but may be a V-shape, an X-shape, or any of other suitable shape. The seal structure 82 (FIG. 7) near the lower end of the pressure tube 75 is identical to the seal structure 81 near the upper end.

The protective tube 77 is made of a flexible material such as neoprene rubber, urethane resin, or the like. The protective tube 77 protects the pressure tube 75 by holding the pressure tube 75 out of contact with the lids 3, 4 of the pressed assembly 21.

FIGS. 9(A) and 9(B) illustrate another seal structure which may be disposed near each of the upper and lower ends of the pressure tube 75. The seal structure 91 includes an annular groove 85 defined in a lid 83. The pressure tube 75 has an upper edge 75e extending in the annular groove 85 which has an inner peripheral surface 85a with a seal ring groove 96 defined therein. A seal ring 97 extending in the seal ring groove 96 is held in intimate contact with the upper edge 75e of the pressure tube 75. The annular groove 85 has an innermost surface 85b serving as a backup portion for the upper edge 75e of the pressure tube 75.

Figure 10B:
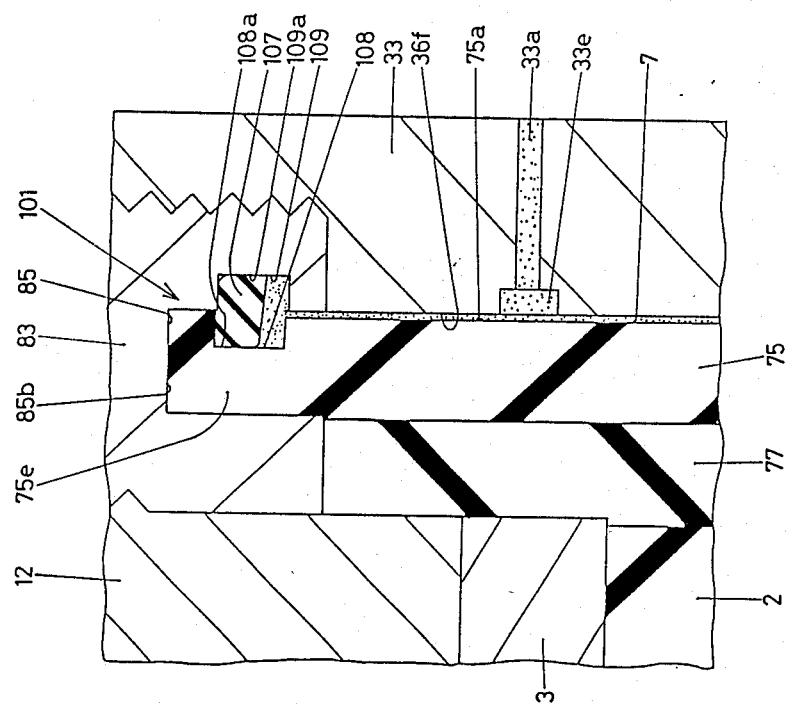
FIG. 10(B) is a view similar to FIG. 10(A), showing the seal structure of FIG. 10(A) while pressurized.
Figure 10A:
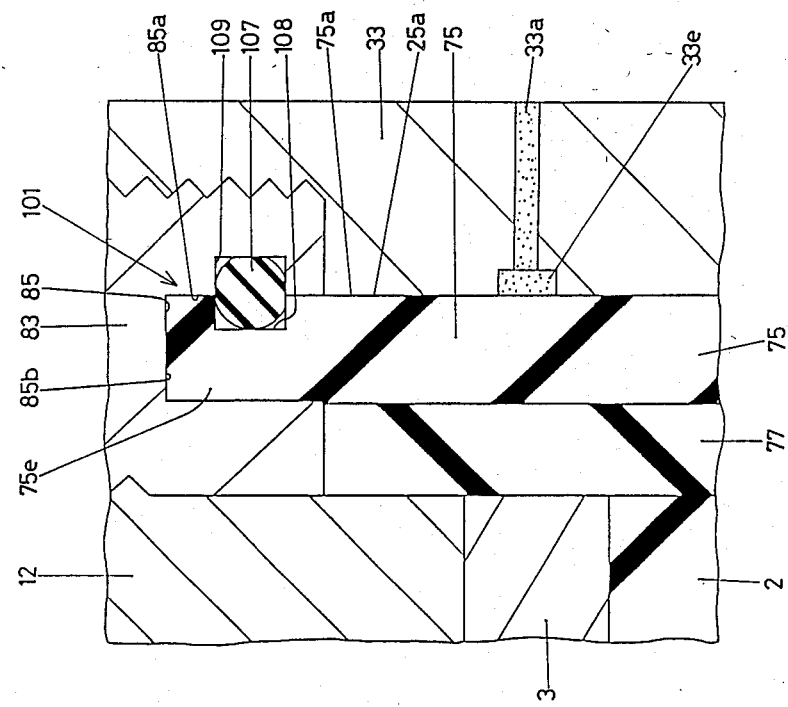
FIG. 10(A) is an enlarged fragmentary cross-sectional view of still another seal structure while not pressurized.

FIGS. 10(A) and 10(B) show still other seal structures which may be disposed near each of the upper and lower ends of the pressure tube 75. The seal structure 101 includes an annular groove 85 defined in a lid 83. The pressure tube 75 has an upper edge 75e fitted in the annular groove 85. Two confronting seal ring grooves 108, 109 are defined, respectively, in the outer peripheral surface 75a of the upper edge 75e and the inner peripheral surface 85a of the annular groove 85. A respective seal ring 107 fitted in the seal ring grooves 108, 109 is held in intimate contact with the bottoms 108a, 109a of the seal ring grooves 108, 109. The annular groove 85 has an innermost surface 85b serving as a backup portion for the upper edge 75e of the pressure tube 75.

(4TH EMBODIMENT)

Figure 12:
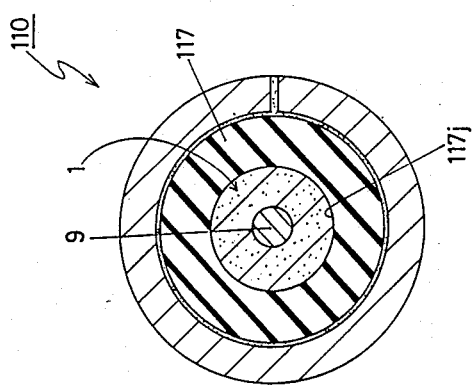
FIG. 12 is a transverse cross-sectional view taken along line XII—XII of FIG. 11.
Figure 11:
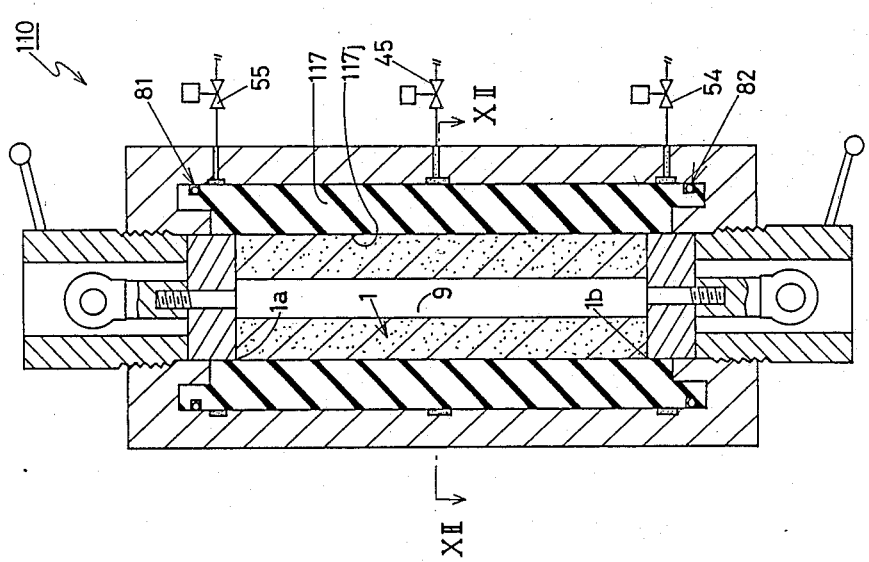
FIG. 11 is a longitudinal cross-sectional view of a dry-type rubber pressing apparatus according to a fourth embodiment of the present invention.

FIGS. 11 and 12 show an apparatus 110 according to a fourth embodiment of the present invention. The apparatus 110 has a powder filling space 1 defined by an inner peripheral surface 117j of a pressure tube 117.

(5TH EMBODIMENT)

Figure 13:
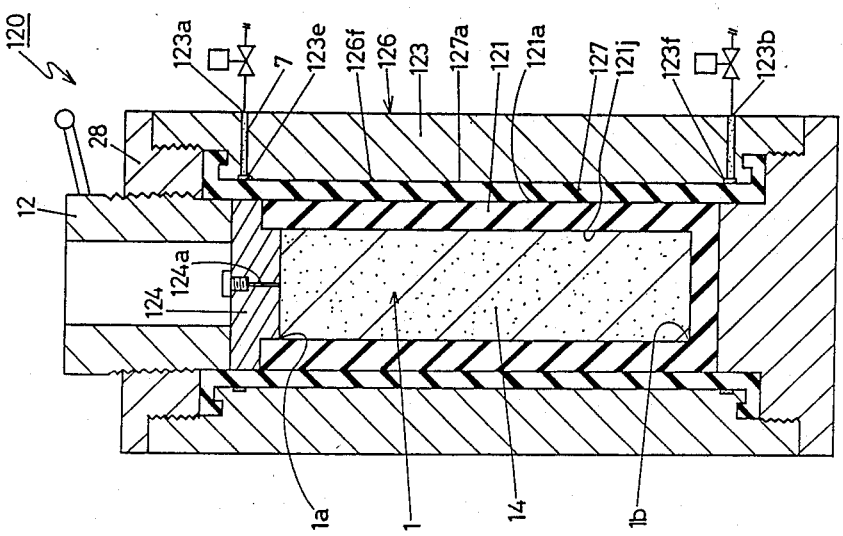
FIG. 13 is a longitudinal cross-sectional view of a dry-type rubber pressing apparatus according to a fifth embodiment of the present invention.
Figure 15:
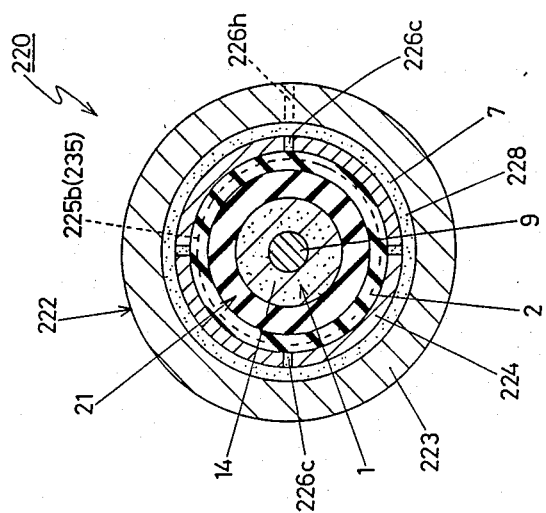
FIG. 15 is a transverse cross-sectional view taken along line XV—XV of FIG. 14.

FIG. 13 shows an apparatus 120 according to a fifth embodiment of the present invention. The apparatus 120 includes a mold 121 having a bottom and around which a pressure tube 127 is fitted. The pressure tube 127 is disposed in a retainer case 126 having annular distribution grooves 123e, 123f near the upper and lower ends of a liquid guide surface 126f on the inner periphery of the outer tube 123. The annular distribution grooves 123e, 123f communicate, respectively, with liquid supply and discharge ports 123a, 123b defined in the retainer case 126. The mold 121 is covered with a lid 124 which may have an air discharge hole 124a.

The operation of the apparatus 120, or a method according to the present invention, will be described below. The flexible mold 121 with a mass of powder 14 filling space 1 is inserted into the flexible pressure tube 127, and the upper opening of the mold 121 is closed by the lid 124. The lid 124 is fastened in position by the clamp 12. Then, the pressurizing liquid 7 is supplied under pressure to the lower liquid supply and discharge port 123b. The supplied liquid 7 pressurizes the outer peripheral surface 127b of the pressure tube 127 progressively upwardly. The mold 121 is then pressurized by the pressure tube 127 progressively upwardly. The powder 14 filled in the mold 121 is in turn pressurized or compacted by the mold 121 progressively from the bottom 1b to upper end 1b of the powder filling space 1. As the powder 14 is progressively compacted, air in the powder 14 is squeezed from the bottom region to upper end 1a of the powder filling space 1 and is then discharged out from the air discharge hole 124a of the lid 124. Where the lid 124 has no air discharge hole 124a, air in the powder 14 is squeezed toward the upper end 1a of the powder filling space 1 where the air is separated from the powder 14. As a consequence, the compacted powder 14 does not contain compressed air which would damage a formed product. The liquid 7 supplied between the entire outer peripheral surface 127a of the pressure tube 127 and the liquid guide surface 126f of the outer tube 123 is pressurized up to a prescribed final pressure level to compact the powder 14. Upon completion of the compaction of the powder over a given period of time, the pressure of the liquid 7 is lowered. As the pressure of the liquid 7 is reduced, the flexible mold 121 and the flexible pressure tube 127 are allowed under their own resiliency to restore their original inside diameters. Finally, the lid 124 is removed from the mold 121, and a solid formed product (not shown) is separated.

(6TH EMBODIMENT)

FIGS. 14 through 18 show an apparatus 220 according to a sixth embodiment of the present invention, the apparatus 220 comprising a pressed assembly 21 and a pressing assembly 22. The pressed assembly 21 has the same structure as that of the first embodiment (FIG. 1).

Figure 14:
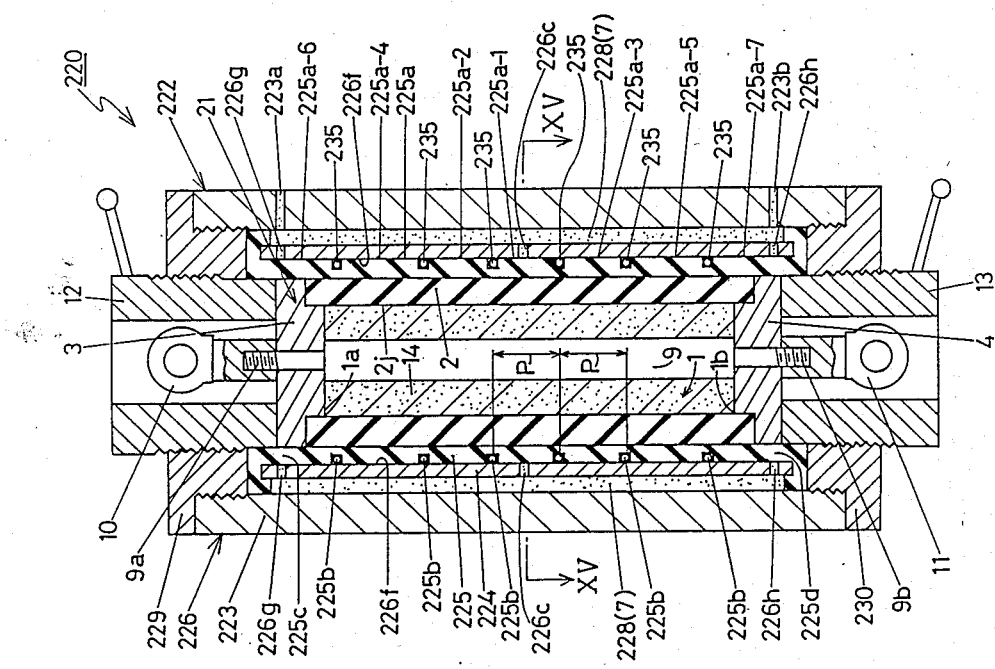
FIG. 14 is a longitudinal cross-sectional view of a dry-type rubber pressing apparatus according to a sixth embodiment of the present invention.
Figure 17:
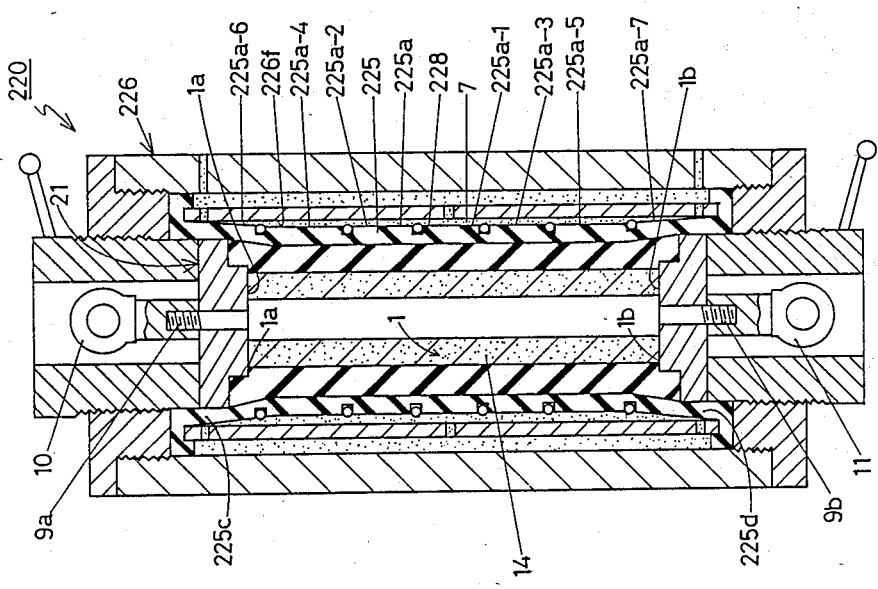
FIG. 17 is a longitudinal cross-sectional view of the apparatus of FIG. 14, showing a pressurizing state.

As shown in FIG. 14, the pressing assembly 22 having an improved structure includes a pressure tube 225 fitted in a retainer case 226. The retainer case 226 comprises a rigid outer tube 223, an inner tube 224 backing the pressure tube 225, and a pair of upper and lower lids 229, 230 threaded over the upper and lower ends, respectively, of the outer tube 223 and sandwiching the pressure tube 225. An annular pressure chamber 228 is defined between the outer tube 223 and the inner tube 224. The pressure tube 225 is made of a flexible material such as neoprene rubber, urethane resin, or the like and has a rubber hardness in the range of 40 to 90 according to Japan Industrial Standard (JIS). The pressure tube 225 has an outer peripheral surface 225a having a plurality of annular grooves 225b defined at suitable intervals P (P=100-300 mm, for example) longitudinally along the outer peripheral surface 225a, defining seven pressurizing regions 225a-1, 225a-2, . . . 225a-7. The central pressurizing region 225a-1 serves as an intial pressurizing region. Resilient seal rings 235 are disposed respectively, in the annular grooves 225b with an interference fit. The cross section of each of the resilient seal rings 235 is not limited to an O-shape, but may be a V-shape, an X-shape, or any of other suitable shape. The inner tube 224 has an inner liquid guide surface 226f held in intimate contact with the resilient seal rings 235. The inner tube 224 has a plurality of radially through liquid supply ports 226c open at the inner liquid guide surface 226f, confronting the initial pressurizing region 225a-1 and communicating with the pressure chamber 228. A suitable number of liquid supply and discharge ports 226g extend radially through the inner tube 224 adjacent the upper end of the liquid guide surface 226f and in communication with the pressure chamber 228, the liquid supply and discharge ports 226g radially confronting the lid 3 through the pressure tube 225. A suitable number of liquid supply and discharge ports 226h are also defined radially through the inner tube 224 adjacent the lower end of the liquid guide surface 226f and in communication with the pressure chamber 228, the liquid supply and discharge ports 226h radially confronting the lid 4 through the pressure tube 225. The upper and lower liquid supply and discharge ports 226g, 226h are provided to discharge air present between the liquid guide surface 226f and the pressure tube 225, and are normally closed off by the outer peripheral surface 225a of the pressure tube 225. Portions 225c, 225d of the pressure tube 225 which close the liquid supply and discharge ports 226g, 226h are radially backed up by the lids 3, 4 of the pressed assembly 21, so that the liquid supply and discharge ports 226g, 226h remain closed until these portions 225c, 225d are flexibly deformed (FIG. 17). The outer tube 223 has liquid supply and discharge ports 223a, 223b defined in the vicinity of upper and lower ends thereof and open to the pressure chamber 228. The liquid supply and discharge ports 223a, 223b are coupled to liquid supply and discharge pipes of a liquid supply and discharge system (not shown).

The number of the pressurizing regions on the outer peripheral surface 225a of the pressure tube 225 is not limited to seven, but two or more pressurizing regions may be defined. The initial pressurizing region is not limited to the central pressurizing region 225a-1, but the most suitable pressurizing region may be selected according to the three-dimensional shape of the product to be formed.

In the apparatus 220 of the illustrated embodiment, the longitudinal axis of the powder filling space 1 is shown as extending vertically. However, the longitudinal axis of the powder filling space 1 may be inclined or horizontal.

Figure 16B:
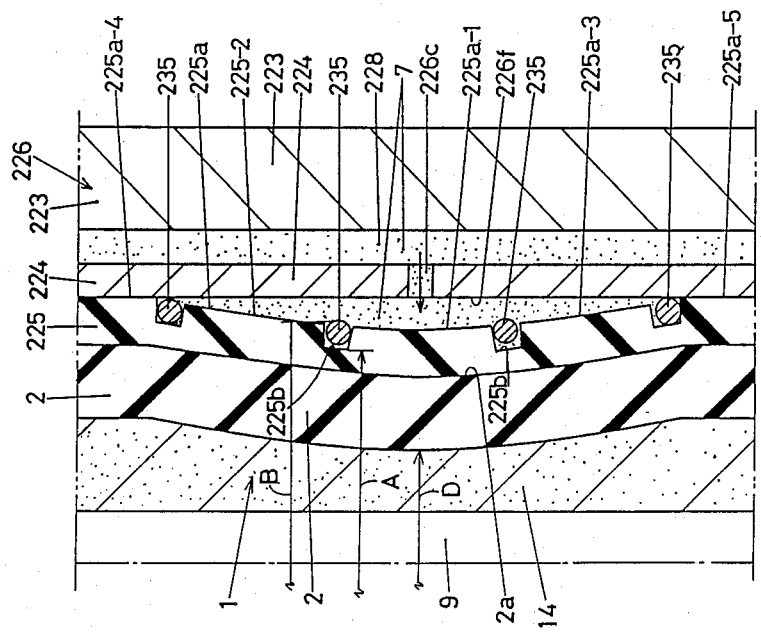
FIGS. 16(A) and 16(B) are enlarged fragmentary longitudinal cross-sectional views showing a pressurizing state in the apparatus of FIG. 14.
Figure 16A:
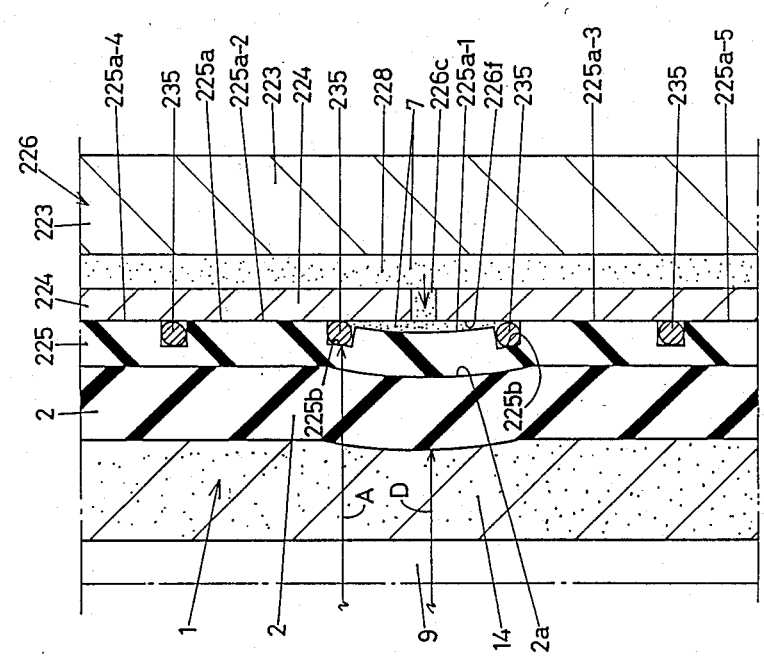
Figure 18:
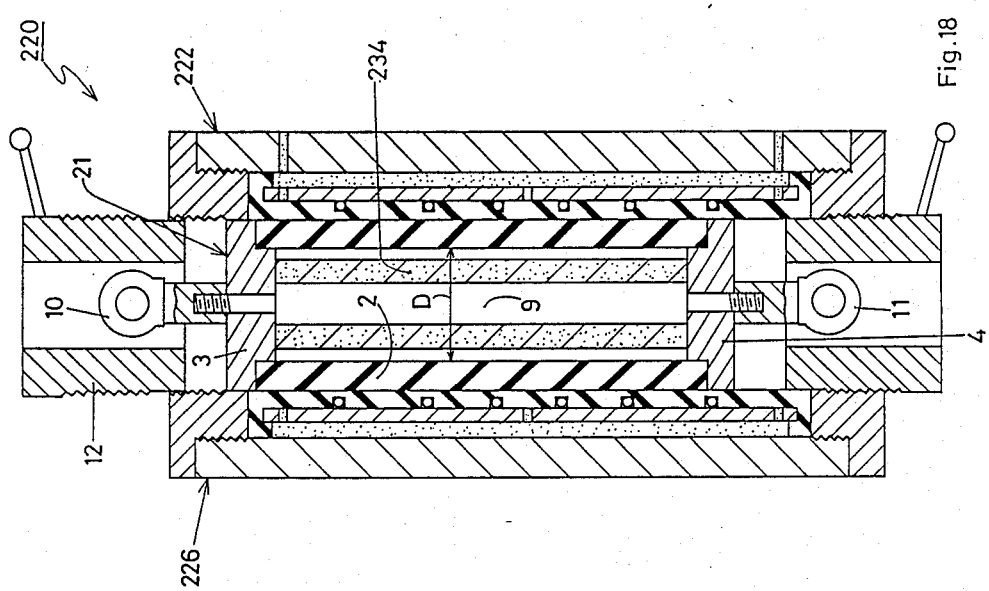
FIG. 18 is a longitudinal cross-sectional view showing the manner in which a formed product is removed from the apparatus of FIG. 14.

The operation of the apparatus 220, or a method according to the present invention, will be described below. As shown FIGS. 14 and 15, the pressed assembly 21 is provided in with a mass of powder 14 in the powder filling space 1. The pressed assembly 21 is then inserted into the pressing assembly 222, and held in position by upper and lower clamps 12, 13 threaded in the pressing assembly 222. Then, a pressurizing liquid 7 (such as oil, glycerin, an aqueous solution of boric acid, or the like) which is supplied under pressure from the liquid supply and discharge system flows through the liquid supply and discharge ports 223a, 223b of the outer tube 223 into the pressure chamber 228. When the pressure of the liquid 7 in the pressure chamber 228 reaches a prescribed level (for example in the range of 50 to 200 kg/cm$^2$), the liquid 7 flows through the liquid supply ports 226c toward the pressure tube 225 and between the initial pressurizing region 225a-1 of the pressure tube 225 and the liquid guide surface 226f. Since the liquid supply and discharge ports 226g, 226h defined adjacent the upper and lower ends of the inner tube 224 are closed by the portions 225c, 225d of the pressure tube 225, the liquid 7 under pressure does not flow out past the pressure tube 225. As shown in FIG. 16(A), the liquid 7 that has flowed to the initial pressurizing region 225a-1 only presses the apparatus at the same to elastically expand it radially inwardly, since the upper and lower ends of the initial pressurizing region 225a-1 are limited by the resilient seal rings 235. The mold 2 is now pressed only at a portion of its outer peripheral surface 2a which faces the initial pressurizing region 225a-1, compacting the powder 14. Air (not shown) in the pressurized powder 14 is increased in pressure and quickly flows into air passages defined by gaps between powder particles which are not compacted. Therefore, no air remains under compression in the pressurized powder 14. As the amount of supplied liquid 7 increases, the initial pressurizing region 225a-1 is more flexed. As shown in FIG. 16(B), the annular grooves 225b defined on opposite sides of the initial pressurizing region 225a-1 are deformed radially inwardly, reducing the annular groove inside diameter A. As the annular groove inside diameter A decreases, the outside diameter B of the resilient seal rings 235 fitted in the respective annular grooves 225b with an interference fit is reduced to develop a gap between the seal rings 235 and the liquid guide surface 226f, whereupon the sealing ability of the seal rings 235 is lost. When the sealing ability of the seal rings 235 is lost, the liquid 7 flows into the pressurizing regions 225a-2, 225a-3 adjacent to the initial pressurizing regions 225a-1 and presses these pressurizing regions 225a-2, 225a-3. The mold 2 is now pressed at portions of its outer peripheral surface 2a positioned in facing relation to the pressurizing regions 225a-2, 225a-3, thereby compacting the powder 14. Air (not shown) in the compacted powder 14 is increased in pressure and quickly flows into air passages defined by gaps between powder particles which are not yet compacted. Therefore, no air remains under pressure in the pressurized powder 14. As the amount of supplied liquid 7 becomes greater, the liquid 7 progressively presses the pressurizing regions 225a-4, 225a-5 and then the pressurizing regions 225a-6, 225a-7 in the same manner as described above, as shown in FIG. 17. In response to such progressive pressurization of the pressure tube 225, the powder 14 filled in the powder filling space 1 is progressively compacted from the region in the powder filling space 1 which confronts the initial pressurizing region 225a-1 toward the ends 1a, 1b of the powder filling space 1. As the powder 14 is axially progressively pressurized or compacted, air present in the powder 14 in the powder filling space 1 is squeezed from the region in the powder filling space 1 which confronts the initial pressurizing region 225a-1 toward the ends 1a, 1b of the powder filling space 1, and is finally discharged out of the powder filling space 1 through the thread gaps defined between the bolt portions 9a, 9b of the core 9 and the nuts 10, 11. Consequently, air under pressure which would damage a formed product is prevented from being trapped in the compacted powder 14. The liquid 7 under pressure supplied between the entire outer peripheral surface 225a and the liquid guide surface 226f is pressurized up to a prescribed final pressure level (for example, in the range of 500 to 5,000 kg/cm$^2$), to compact the powder 14. After pressurization is performed over a prescribed period of time, the pressure of the liquid 7 in the pressure chamber 228 is reduced. As the pressure of the liquid 7 is lowered, the flexible mold 2 and the pressure tube 225 return to their original shape under their own resiliency until the original inside diameter D of the mold 2 is recovered, as shown in FIG. 18. After the upper clamp 12 has been detached from the retainer case 226, the pressed assembly 21 is pulled out of the retainer case 226. Then, the nuts 10, 11 and the lids 3, 4 are removed, and the formed product 234 and the core 9 are separated from each other.

(7TH EMBODIMENT)

Figure 19:
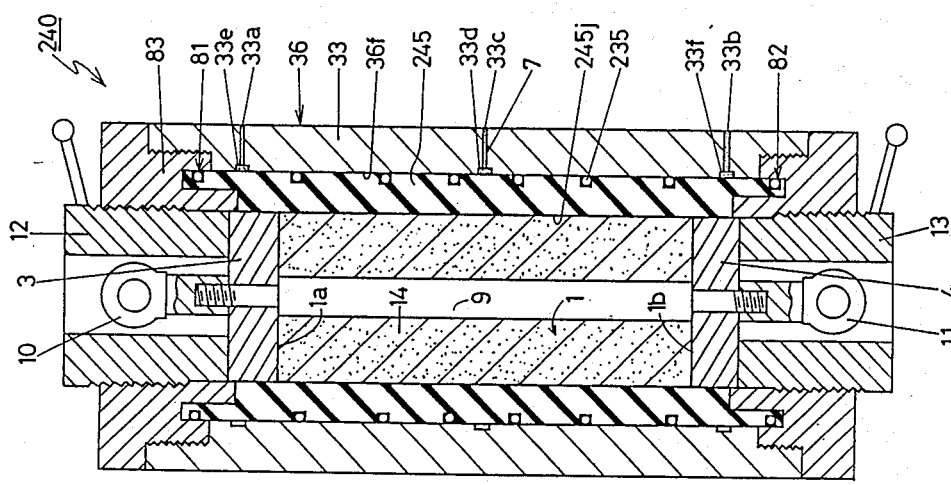
FIG. 19 is a longitudinal cross-sectional view of a dry-type rubber pressing apparatus according to a seventh embodiment of the present invention.

FIG. 19 shows an apparatus 240 according to a seventh embodiment of the present invention. The apparatus 240 is mast significantly different from the sixth embodiment (FIG. 14) in that a retainer case 36 is similar to that of the third embodiment (FIG. 7), no mold is provided, and an inner surface 245j of a pressure tube 245 serves as a powder compacting surface.

(8TH EMBODIMENT)

FIGS. 20 through 24 show an apparatus 320 according to an eighth embodiment of the present invention, the apparatus 320 comprising a pressed assembly 21 and a pressing assembly 322. The pressed assembly 21 has the same structure as that of the first embodiment (FIG. 1).

Figure 23:
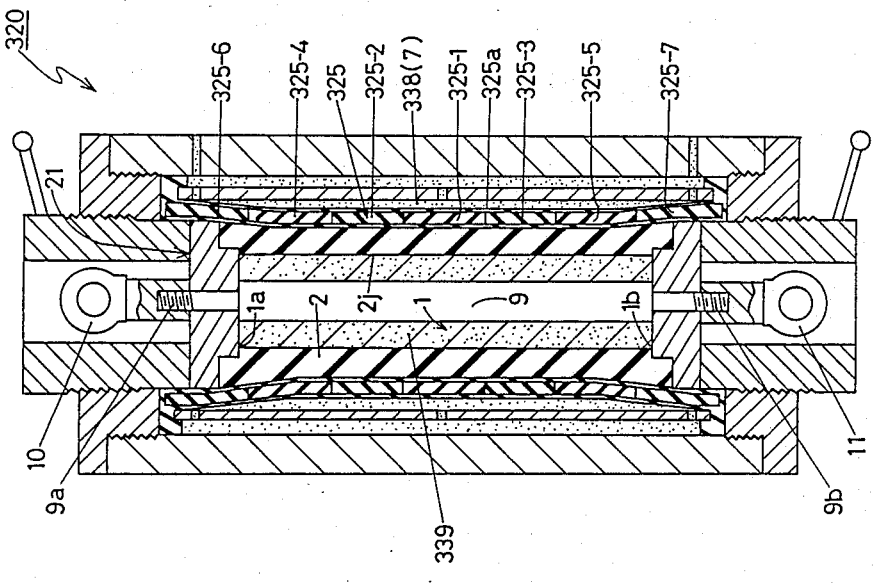
FIG. 23 is a longitudinal cross-sectional view of the apparatus of FIG. 20, showing a pressurizing state.

As shown in FIG. 20, the pressing assembly 322 having an improved structure includes a pressure tube 325 fitted in a retainer case 326. The retainer case 326 comprises a rigid outer tube 323, an inner tube 324 backing the pressure tube 325, and a pair of upper and lower lids 331, 332 threaded over the upper and lower ends, respectively, of the outer tube 323 and sandwiching the pressure tube 325. An annular pressure chamber 338 is defined between the outer tube 323 and the inner tube 324. The pressure tube 325 is made of a flexible material such as neoprene rubber, urethane resin, or the like and has a core layer 327 covered with a covering layer 328. The core layer 327 comprises an array of separate ring members 327a, 327b, 327c, 327d held in endwise abutment and each having a length L in the range of 100 to 300 mm, for example. The ring members 327a, 327b, 327b, 327d have moduli of elasticity that are progressively greater from the, central ring member 327a to the rings closest to the open ends 1a, 1b of the powder filling space 1. To obtain a desired Young's modulus, the rubber hardness of the ring members 327a, 327b, 327c, 327d may be selected in the JIS rubber hardness range of 40 to 90, for example. The pressure tube 325 is not limited to the illustrated structure, but may comprise only the core layer 327. The pressure tube 325 has seven pressurizing regions 325-1, 325-2, . . . 325-7, the central pressurizing region 325-1 serving as an intial pressurizing region. The inner tube 324 has an inner liquid guide surface 326f held in intimate contact with the outer peripheral surface 325a of the pressure tube 325. The inner tube 324 has a plurality of radially, extending liquid supply ports 326c open at the inner liquid guide surface 326f confronting the initial pressurizing region 325-1 and communicating with the pressure chamber 338. A suitable number of liquid supply and discharge ports 326g extend radially through the inner tube 324 adjacent the upper end of the liquid guide surface 326f and in communication with the pressure chamber 338, the liquid supply and discharge ports 326g radially confronting the lid 3 through the pressure tube 325. A suitable number of liquid supply and discharge ports 326h also extend radially through the inner tube 324 adjacent the lower end of the liquid guide surface 326f and in communication with the pressure chamber 338, the liquid supply and discharge ports 326h radially confronting the lid 4 through the pressure tube 325. The upper and lower liquid supply and discharge ports 326g, 326h are provided to discharge air present between the liquid guide surface 326f and the pressure tube 325, and are normally closed off by the outer peripheral surface 325a of the pressure tube 325. Portions 325c, 325d of the pressure tube 325 which close the liquid supply and discharge ports 326g, 326h are radially backed by the lids 3, 4 of the pressed assembly 21, so that the liquid supply and discharge ports 326g, 326h remain closed until these portions 325c, 325d are flexibly deformed (FIG. 23). The outer tube 323 has liquid supply and discharge ports 323a, 323b defined in the vicinity of upper and lower ends thereof and open to the pressure chamber 338. The liquid supply and discharge ports 323a, 323b are coupled to liquid supply and discharge pipes of a liquid supply and discharge system (not shown).

The number of the pressurizing regions of the pressure tube 325 is not limited to seven, but two or more pressurizing regions may be defined. The initial pressurizing region is not limited to the central, pressurizing region 325-1, but any number of plural pressurizing regions may be selected.

In the apparatus 320 of the illustrated embodiment, the longitudinal axis of the powder filling space 1 is shown as extending vertically. However, the longitudinal axis of the powder filling space 1 may be inclined or horizontal.

Figure 22B:
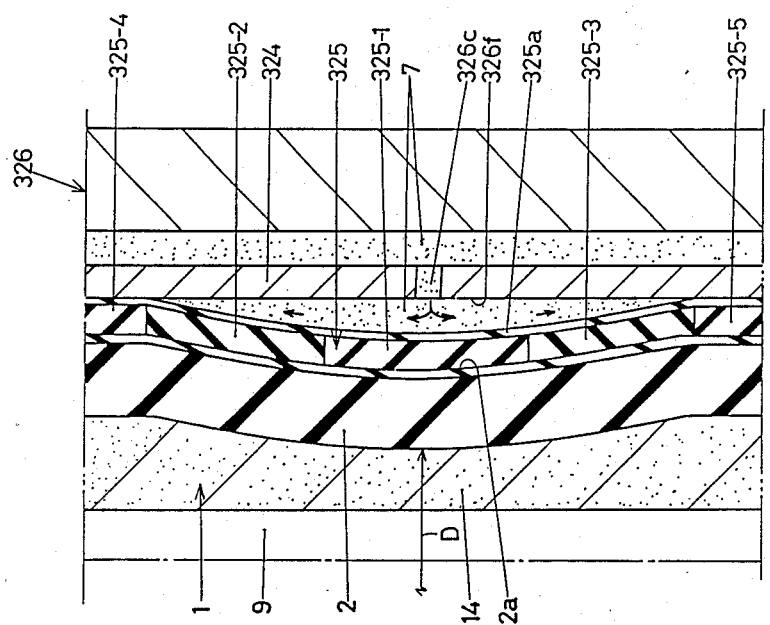
FIGS. 22(A) and 22(B) are enlarged fragmentary longitudinal cross-sectional views showing a pressurizing state in the apparatus of FIG. 20.
Figure 22A:
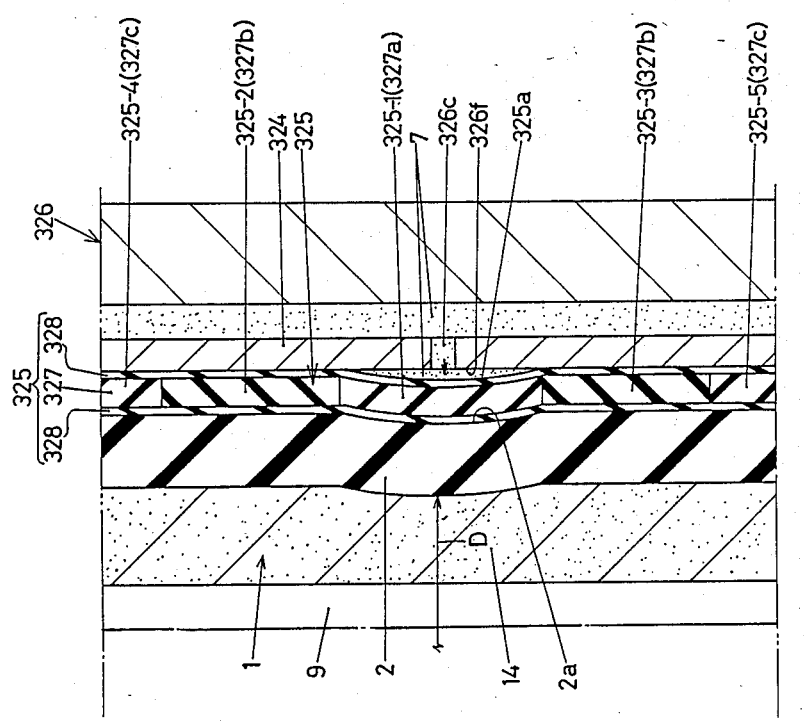
Figure 24:
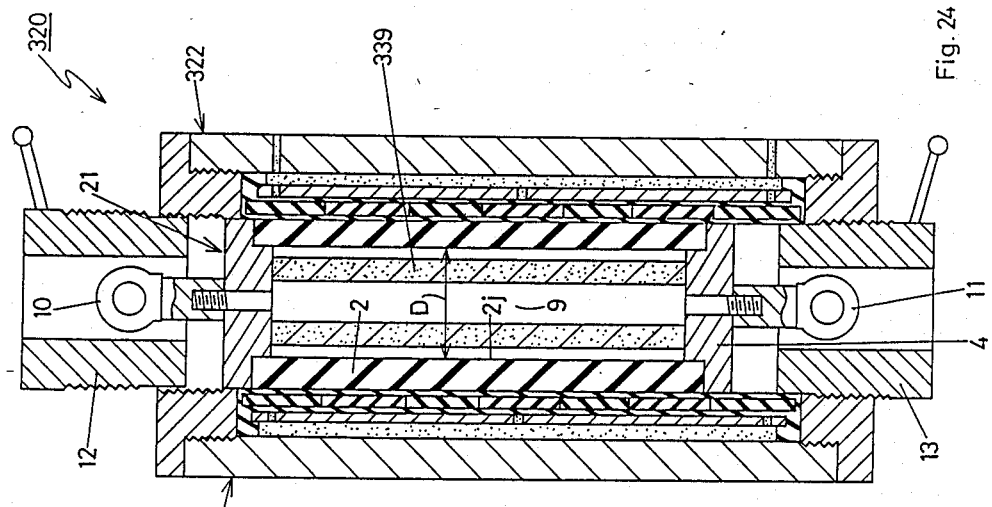
FIG. 24 is a longitudinal cross-sectional view showing the manner in which a formed product is removed from the apparatus of FIG. 20.

The operation of the apparatus 320, or a method according to the present invention, will be described below. As shown in FIGS. 20 and 21, the pressed assembly 21 is provided with a mass of powder 14 in the powder filling space 1. The pressed assembly 21 is then inserted into the pressing assembly 322, and is held in position by upper and lower clamps 12, 13 threaded in the pressing assembly 322. Then, a pressurizing liquid 7 (such as oil, glycerin, an aqueous solution of boric acid, or the like) which is supplied under pressure from the liquid supply and discharge system flows through the liquid supply and discharge ports 323a, 323b of the outer tube 323 into the pressure chamber 338. When the pressure of the liquid 7 in the pressure chamber 338 reaches a prescribed level (for example in the range of from 50 to 200 kg/cm$^2$), the liquid 7 flows through the liquid supply ports 326c toward the pressure tube 325 and enters between the initial pressurizing region 325-1 of the pressure tube 325 and the liquid guide surface 326f. Since the liquid supply and discharge ports 326g, 326h defined closely to the upper and lower ends of the inner tube 324 are closed by the portions 325c, 325d of the pressure tube 325, the liquid 7 under pressure does not flow out past the pressure tube 325. As shown in FIG. 22(A), the liquid 7 flowed to the initial pressurizing region 325-1 first presses the same to elastically expands it radially inwardly, since the modulus of elasticity of the initial pressurizing region 325-1 is smaller than those of the pressurizing regions 325-2, 325-3, and hence the initial pressurizing region 325-1 is deformed more easily. The mold 2 is now pressed only at a portion of its outer peripheral surface 2a which faces the initial pressurizing region 325-1, compacting the powder 14. Air (not shown) in the pressurized powder 14 is increased in pressure and quickly flows into air passages defined by gaps between powder particles which are not compacted. Therefore, no air remains under compression in the pressurized powder 14. As the amount of supplied liquid 7 increases, the initial pressurizing region 325-1 is more flexed, and, as shown in FIG. 22(B), the liquid 7 flows into the pressurizing regions 325-2, 325-3 adjacent the initial pressurizing regions 325-1 and presses these pressurizing regions 325-2, 325-3. The mold 2 is now pressed at portions of its outer peripheral surface 2a which face the pressurizing regions 325-2, 325-3, thereby compacting the powder 14. The pressure of air (not shown) in the compacted powder 14 is increased and the air quickly flows into air passages defined by gaps between powder particles which are not yet compacted. Therefore, no air remains under pressure in the pressurized powder 14. The pressure of the liquid 7 is larger when the pressurizing regions 325-2, 325-3 are pressed than when pressing the initial pressurizing region 325-1 are pressed. As the pressurizing force is increased, the powder 14 which has initially been compacted in the region of the powder filling space 1 confronting the initial pressurizing region 325-1 is further pressurized. The increased pressurizing force is also effective to discharge a small amount of compressed air remaining in the powder 14, thus fully removing compressed air from the powder 14. As the pressure of supplied liquid 7 becomes greater, the liquid 7 progressively presses the pressurizing regions 325-4, 325-5 and then the pressurizing regions 325-6, 325-7 in the same manner as described above, as shown in FIG. 23. In response to such progressive pressurization of the pressure tube 325, the powder 14 in the powder filling space 1 is progressively compacted from the region in the powder filling space 1 which confronts the initial pressurizing region 325-1 toward the ends 1a, 1b of the powder filling space 1. As the powder 14 is axially progressively pressurized or compacted, air present in the powder 14 filled in the powder filling space 1 is squeezed from the region in the powder filling space 1 which confronts the initial pressurizing region 325-1 toward the ends 1a, 1b of the powder filling space 1, and is finally discharged out of the powder filling space 1 through the thread gaps defined between the bolt portions 9a, 9b of the core 9 and the nuts 10, 11. Consequently, air under pressure which would damage a formed product is prevented from being trapped in the compacted powder 14. The liquid 7 under pressure supplied between the entire outer peripheral surface 325a and the liquid guide surface 326f is pressurized up to a prescribed final pressure level (for example, in the range of 500 to 5,000 kg/cm$^2$) to compact the powder 14. After pressurization is performed over a prescribed period of time, the pressure of the liquid 7 in the pressure chamber 338 is reduced. As the pressure of the liquid 7 is lowered, the flexible mold 2 and the pressure tube 325 return to their original shape under their own resiliency until the original inside diameter D of the mold 2 is recovered, as shown in FIG. 24. After the upper clamp 12 has been detached from the retainer case 326, the pressed assembly 21 is pulled out of the retainer case 326. Then, the nuts 10, 11 and the lids 3, 4 are removed, and the formed product 339 and the core 9 are separated from each other.

(9TH EMBODIMENT)

Figure 25:
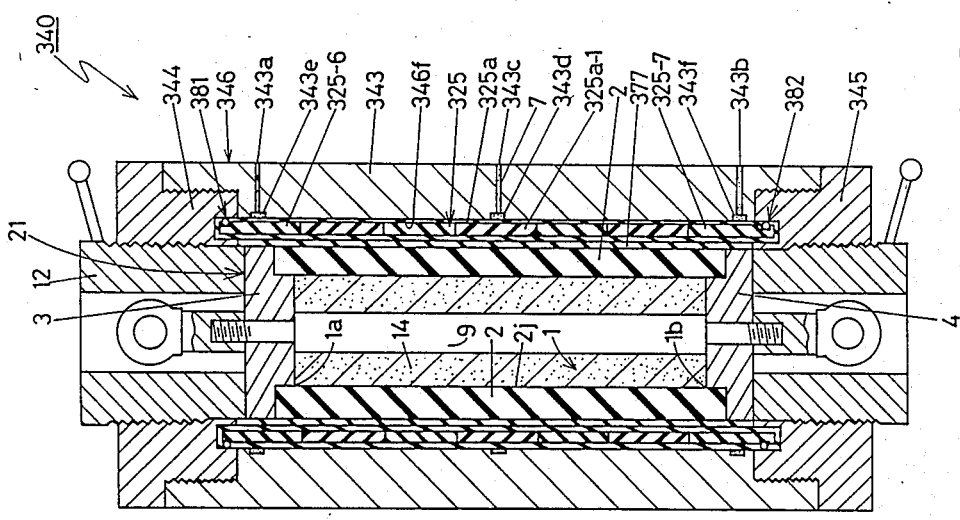
FIG. 25 is a longitudinal cross-sectional view of a dry-type rubber pressing apparatus according to a ninth embodiment of the present invention.

FIG. 25 shows an apparatus 340 according to a ninth embodiment of the present invention. The apparatus 340 differs from the apparatus 320 of the eighth embodiment (FIG. 20) with respect to the structure of a retainer case 346, seal structures 381, 382 near the upper and lower ends of the pressure tube 325, and in that a protective tube 377 is interposed between the pressure tube 325 and the mold 2.

The retainer case 346 comprises a rigid outer tube 343 and two lids 344, 345 threaded to the outer tube 343 in upper and lower openings, respectively, thereof. The pressure tube 325 is fitted in the retainer case 346 which has a liquid guide surface 346f defined on the outer tube 343 confronting the outer peripheral surface 325a of the pressure tube 325. The liquid guide surface 346f has an annular distribution groove 343d confronting the intial pressurizing region 325-1 of the pressure tube 325, an annular distribution groove 343l confronting the upper pressurizing region 325-6, and to annular distribution groove 343f confronting the lower pressurizing region 325-7. The outer tube 343 has liquid supply and discharge ports 343c, 343a, 343b defined therein and communicating, respectively, with the annular distribution grooves 343d, 343e, 343f. After the pressurizing liquid 7 fills the space between the liquid guide surface 346f and the pressure tube 325, it is supplied from the central liquid supply and discharge port 343c and discharged from the upper and lower liquid supply and discharge ports 343a, 343b to remove air completely.

The protective tube 377 is made of a flexible material such as neoprene rubber, urethane resin, or the like. The protective tube 377 protects the pressure tube 325 by holding the pressure tube 325 out of contact with the lids 3, 4 of the pressed assembly 21.

Figure 26:
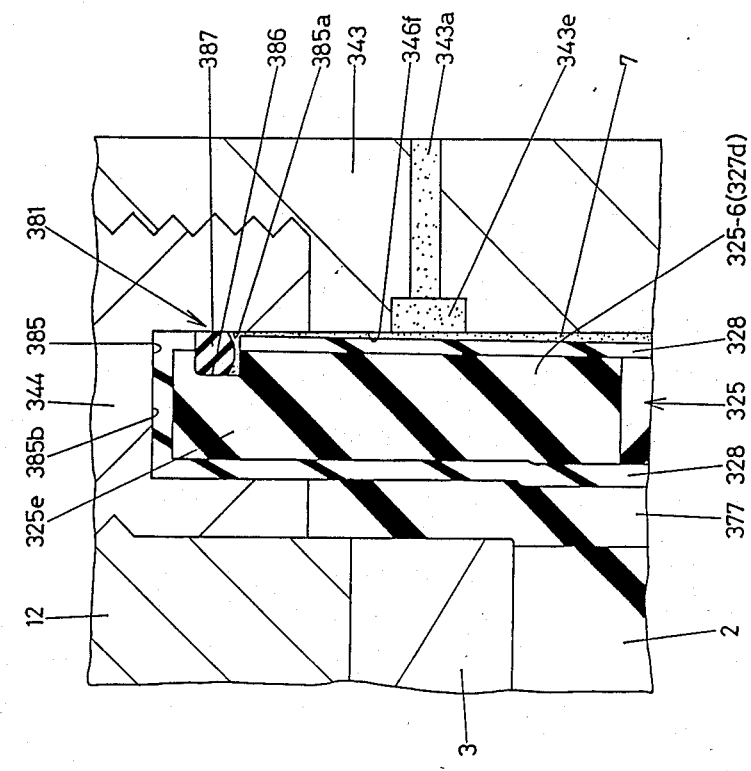
FIG. 26 is an enlarged fragmentary cross-sectional view of a seal structure in a pressure tube in the apparatus of FIG. 25.

As shown in FIG. 26, the seal structure 381 near the upper end of the pressure tube 325 includes an annular groove 385 defined in a lid 344. The pressure tube 325 has an upper edge 325e extending in the annular groove 385 and having an outer peripheral surface 325a with a seal ring groove 386 defined therein. A seal ring 387 extending in the seal ring groove 386 is held in intimate contact with the inner peripheral surface 385a of the annular groove 385. The annular groove 385 has an innermost surface 385b serving as a backup portion for the upper edge 325e of the pressure tube 325. The cross section of the seal ring 387 is not limited to an O-shape, but may be a V-shape, an X-shape, or any other suitable shape. The seal structure 382 (FIG. 25) near the lower end of the pressure tube 325 is identical to the seal structure 381 near the upper end.

FIGS. 27(A) and 27(B) illustrate another seal structure which may be disposed near each of the upper and lower ends of the pressure tube 325. The seal structure 391 includes an annular groove 385 defined in a lid 344. The pressure tube 325 has an upper edge 325e extending in the annular groove 385 which has an inner peripheral surface 385a with a seal ring groove 396 defined therein. A seal ring 397 extending in the seal ring groove 396 is held in intimate contact with the upper edge 325e of the pressure tube 325. The annular groove 385 has an innermost surface 385b serving as a backup portion for the upper edge 325e of the pressure tube 325.

Figure 28B:
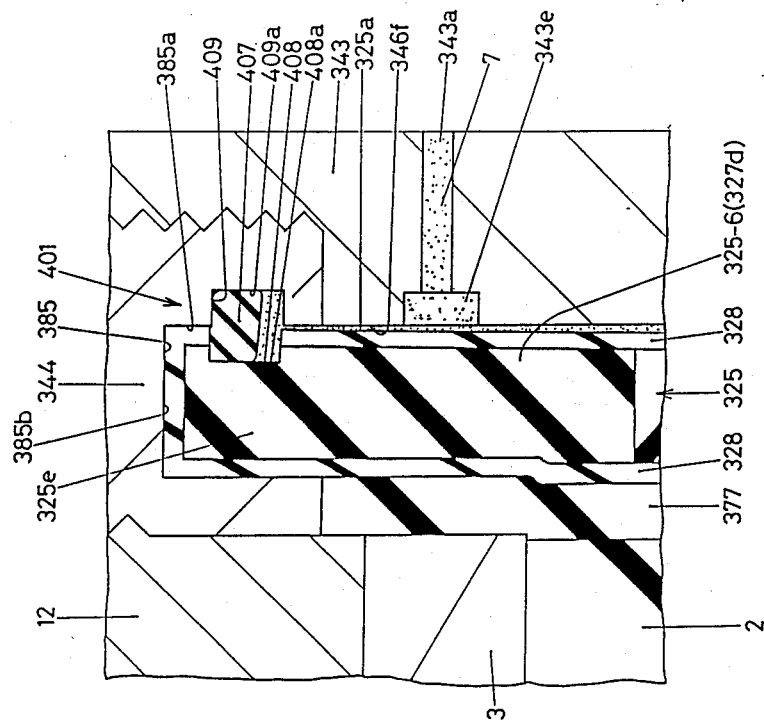
FIG. 28(B) is a view similar to FIG. 28(A), showing the seal structure of FIG. 28(A) while pressurized.
Figure 28A:
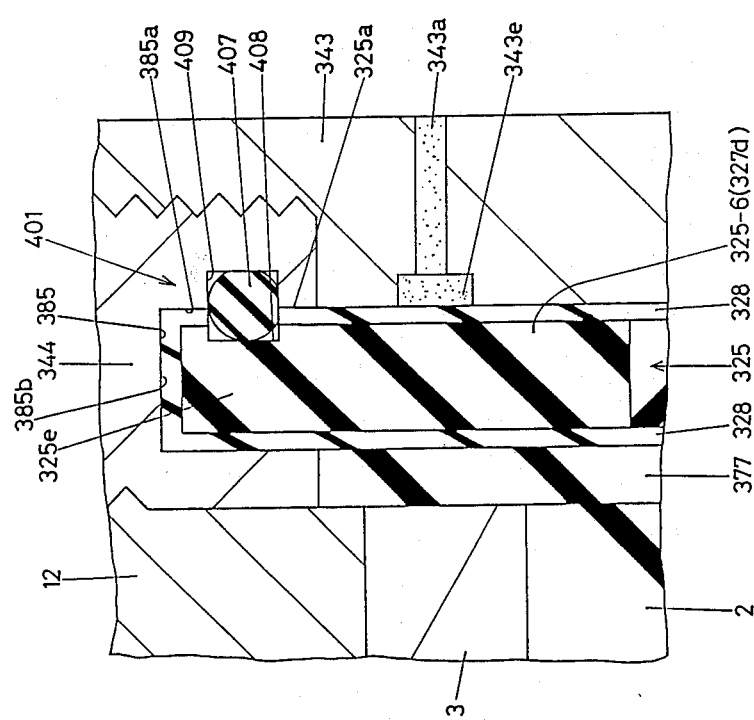
FIG. 28(A) is an enlarged fragmentary cross-sectional view of still another seal structure while not pressurized.

FIGS. 28(A) and 28(B) show still another seal structure which may be disposed near each of the upper and lower ends of the pressure tube 325. The seal structure 401 includes an annular groove 385 defined in a lid 344. The pressure tube 325 has an upper edge 325e extending in the annular groove 385. Two confronting seal ring grooves 408, 409 are defined, respectively, in the outer peripheral surface 325a of the upper edge 325e and the inner peripheral surface 385a of the annular groove 385. A seal ring 407 disposed in the seal ring grooves 408, 409 is held in intimate contact with the bottoms 408a, 409a of the seal ring grooves 408, 409. The annular groove 385 has an innermost surface 385b serving as a backup portion for the upper edge 325e of the pressure tube 325.

(10TH EMBODIMENT)

Figure 29:
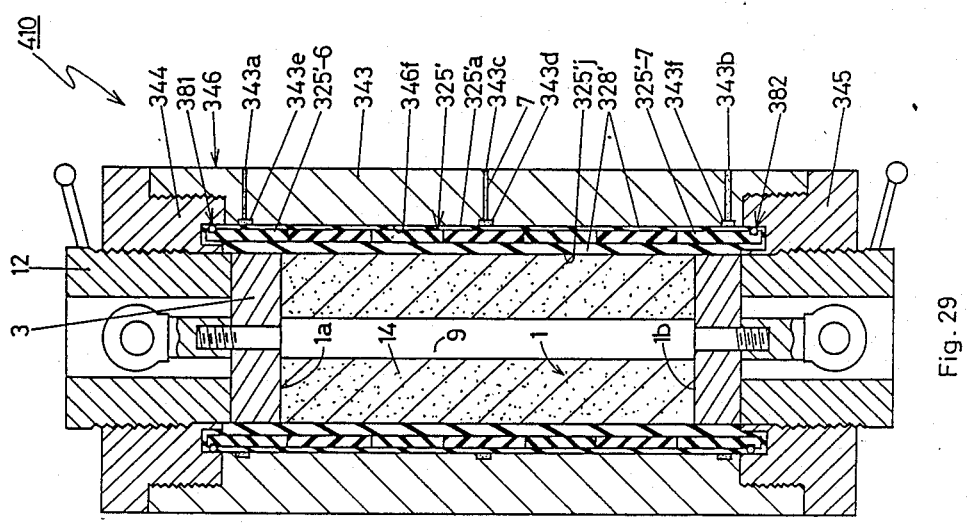
FIG. 29 is a longitudinal cross-sectional view of a dry-type rubber pressing apparatus according to a tenth embodiment of the present invention.

FIG. 29 shows an apparatus 410 according to a tenth embodiment of the present invention. The apparatus 410 is different from the apparatus 340 (FIG. 25) of the ninth embodiment in that a mold and a protective tube are not provided, and the inner surface 325'j of a pressure tube 325' serves as a powder compacting surface.

(11TH EMBODIMENT)

FIGS. 30 through 35 illustrate an apparatus 440 according to an eleventh embodiment of the present invention. The apparatus 440 is most significantly different from the apparatus 220 (FIG. 14) of the sixth embodiment in that a backup tube 457 is interposed between a pressure tube 225 retained by a retainer case 456 and a mold 2. The backup tube 457 is made of a flexible material such as neoprene rubber, urethane resin, or the like and has a modulus of elasticity that becomes progressively greater from its region confronting the initial pressurizing region 225a-1 on the outer peripheral surface 225a of the pressure tube 225 to its regions closest to the open ends 1a, 1b of the powder filling space 1. As shown in FIG. 30, the backup tube 457 comprises an array of separate ring members 457a, 457b, 457c, 457d held in endwise abutment and having different moduli of elasticity. To obtain a desired modulus of elasticity, the rubber hardness of the ring members 457a, 457b, 457c, 457d may be selected in the JIS rubber hardness range of 40 to 90, for example. As shown in FIG. 32, the array of separate ring members 457a, 457b, 457c, 457d having different moduli of elasticity may be covered with inner and outer flexible layers 457h, 457i. The backup tube 457 is not limited to the illustrated structure with its modulus of elasticity varying in a stepwise manner, but the modulus of elasticity of the backup tube 457 may continuously increase from the region confronting the initial pressurizing region 225a-1 on the pressure tube 225 to the regions closest to the open ends 1a, 1b of the powder filling space 1.

Figure 33B:
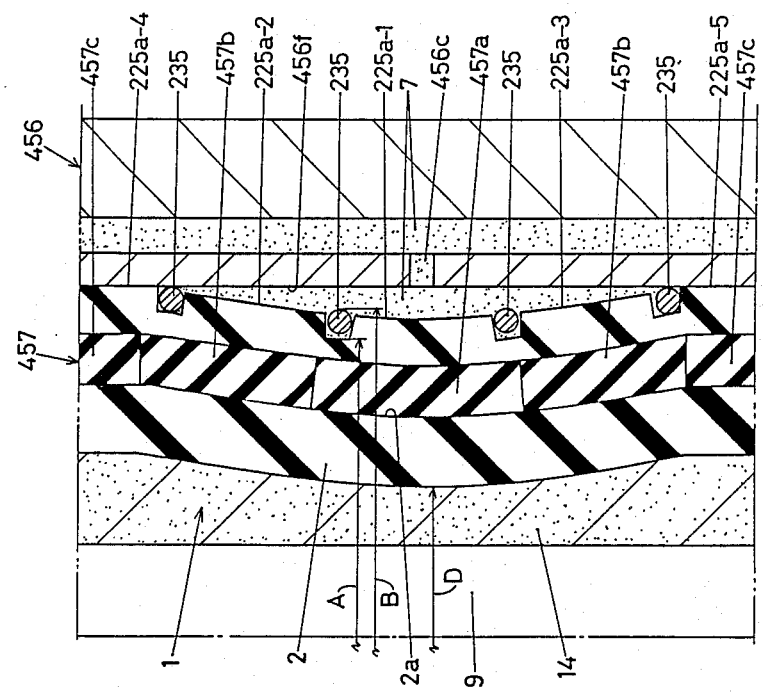
FIGS. 33(A) and 33(B) are enlarged fragmentary longitudinal cross-sectional views showing a pressurizing state.
Figure 33A:
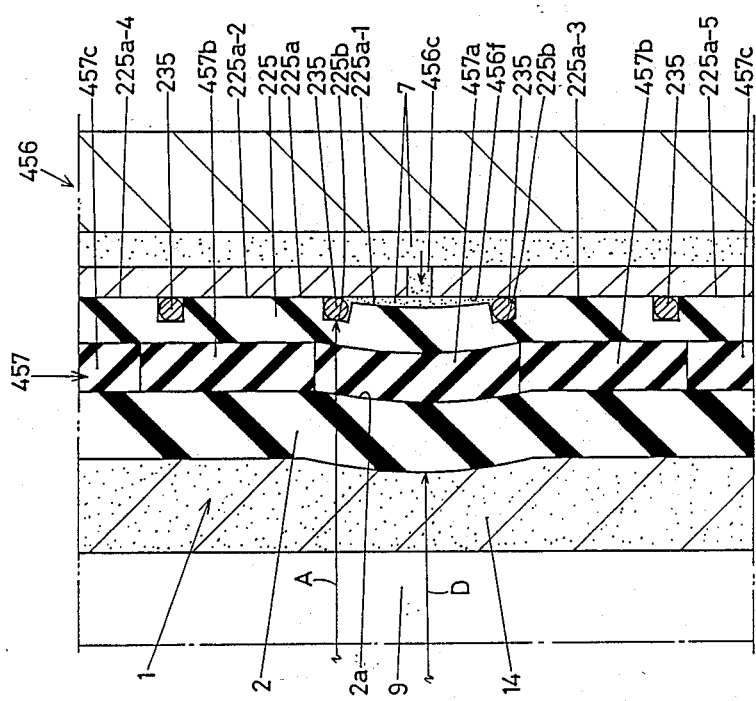
Figure 35:
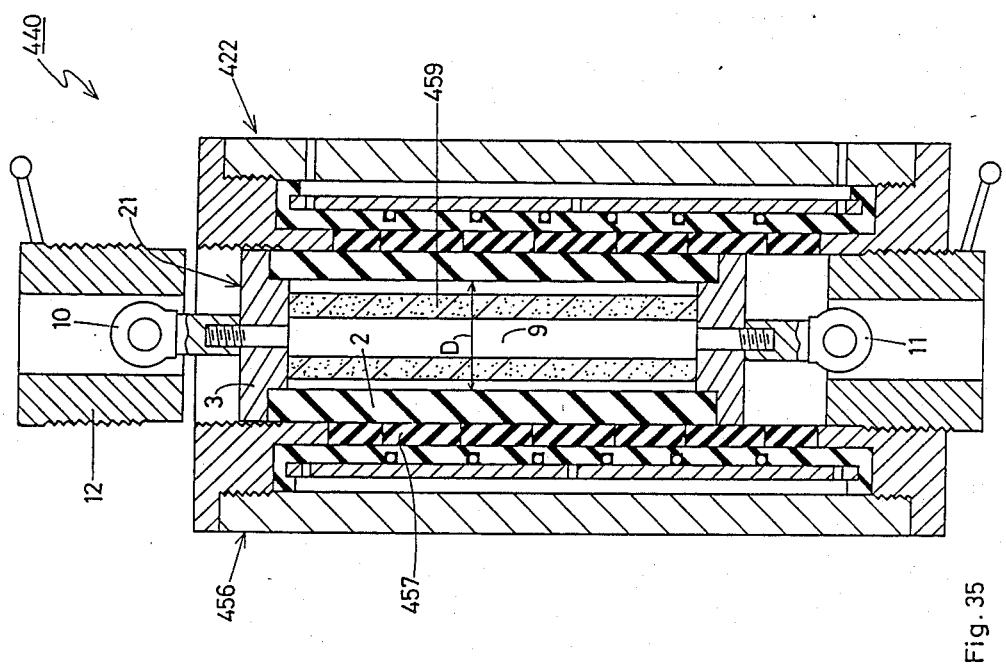
FIG. 35 is a longitudinal cross-sectional view showing the manner in which a formed product is removed from the apparatus of FIG. 30.
Figure 34:
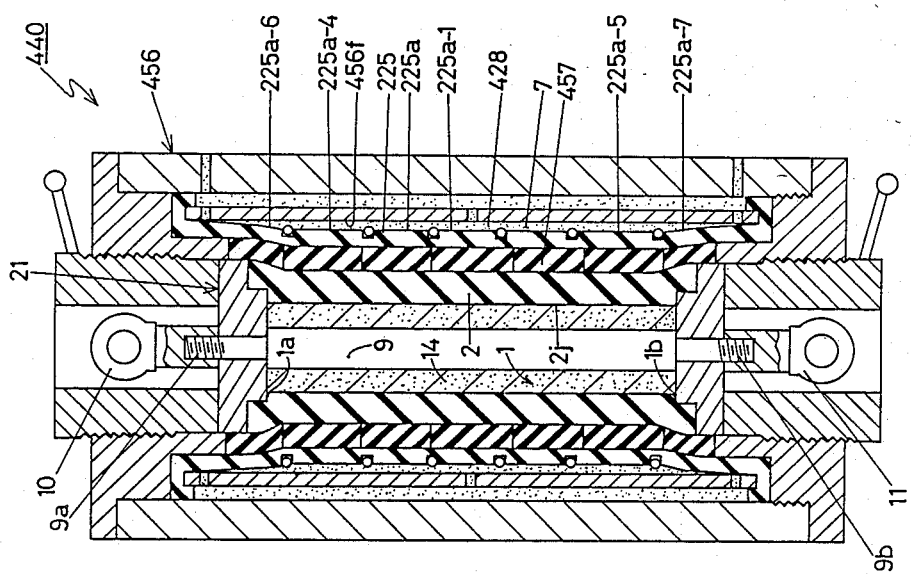
FIG. 34 is a longitudinal cross-sectional view of the apparatus of FIG. 30, showing a pressurizing state.

The operation of the apparatus 440, or a method according to the present invention, will be described below. As shown in FIGS. 30 and 31, the pressed assembly 21 with the powder 14 in the powder filling space 1 is inserted into the pressing assembly 422. When the pressure of the pressurizing liquid 7 supplied to a pressure chamber 428 reaches a prescribed pressure level (for example in the range of 50 to 200 kg/cm$^2$), the liquid 7 flows out through liquid supply ports 456c and between the initial pressurizing region 225a-1 of the pressure tube 225 and a liquid guide surface 456f of the retainer case 456. Since liquid supply and discharge ports 456g, 456h defined adjacent the upper and lower ends of an inner tube 424 are closed by annular portions 429a, 430a of lids 429, 430, the liquid 7 under pressure does not flow out past the pressure tube 225. As shown in FIG. 33(A), the liquid 7 that has flowed to the initial pressurizing region 225a-1 first presses the pressed assembly at only the same to elastically expand it radially inwardly, since the the upper and lower ends of the initial pressurizing region 225a-1 are limited by the resilient seal rings 235. The mold 2 is now pressed only at a portion of its outer peripheral surface 2a which faces the initial pressurizing region 225a-1, compacting the powder 14. The pressure of air (not shown) in the pressurized powder 14 is increased and the air quickly flows into air passages defined by gaps between powder particles which are not compacted. Therefore, no air remains under pressure in the pressurized powder 14. As the amount of supplied liquid 7 increases, the pressure tube 225 of initial pressurizing region 225a-1 and the region of the backup tube 457 which confronts the initial pressuring region 225a-1 are flexed more. As these regions are flexed more, the pressurizing liquid 7 flows into the pressurizing regions 225a-2, 225a-3 adjacent to the initial pressurizing region and presses these pressurizing regions 225a-2, 225a-3. The mold 2 is now pressed at portions of its outer peripheral surface 2a which face the pressurizing regions 225a-2, 225a-3, thereby compacting the powder 14. The pressure of air (not shown) in the compacted powder 14 is increased and the air quickly flows into air passages defined by gaps between powder particles which are not yet compacted. Therefore, no air remains under pressure in the pressurized powder 14. The pressure of the liquid 7 which presses the pressurizing regions 225a-2, 225a-3 is larger than when pressing the initial pressurizing region 225a-1 only since the modulus of elasticity of the ring members 457b is larger than that of the ring member 457a. As the pressurizing force is increased, the powder 14 which has initially been compacted in the region of the powder filling space 1 confronting the initial pressurizing region 225a-1 is further pressurized. The increased pressurizing force is also effective to discharge a small amount of compressed air remaining in the powder 14, thus fully removing compressed air from the powder 14. As the pressure of supplied liquid 7 becomes greater, the liquid 7 progressively presses the pressurizing regions 225a-4, 225a-5 and then the pressurizing regions 225a-6, 225a-7 in the same manner as described above, as shown in FIG. 34. In response to the progressive pressurization of the pressure tube 225, the powder 14 in the powder filling space 1 is progressively compacted from the region in the powder filling space 1 which confronts the initial pressurizing region 225a-1 toward the ends 1a, 1b of the powder filling space 1. As the powder 14 is axially progressively pressurized or compacted, air present in the powder 14 in the powder filling space 1 is squeezed from the region in the powder filling space 1 which confronts the initial pressurizing region 225a-1 toward the ends 1a, 1b of the powder filling space 1, and is finally discharged out of the powder filling space 1 through the thread gaps defined between the bolt portions 9a, 9b of the core 9 and the nuts 10, 11. Consequently, air under pressure which would damage a formed product is prevented from being trapped in the compacted powder 14. The liquid 7 under pressure supplied between the entire outer peripheral surface 225a and the liquid guide surface 456f is pressurized up to a prescribed final pressure level (for example, in the range of 500 to 5,000 kg/cm$^2$), to compact the powder 14. After pressurization is performed over a prescribed period of time, the pressure of the liquid 7 in the pressure chamber 428 is reduced. As the pressure of the liquid 7 is lowered, the flexible mold 2, the backup tube 457, and the pressure tube 225 return to their original shape under their own resiliency until the original inside diameter D of the mold 2 is recovered, as shown in FIG. 35. After the upper clamp 12 has been detached from the retainer case 456, the pressed assembly 21 is pulled out of the retainer case 456, and a formed product 459 is separated.

(12TH EMBODIMENT)

Figure 36:
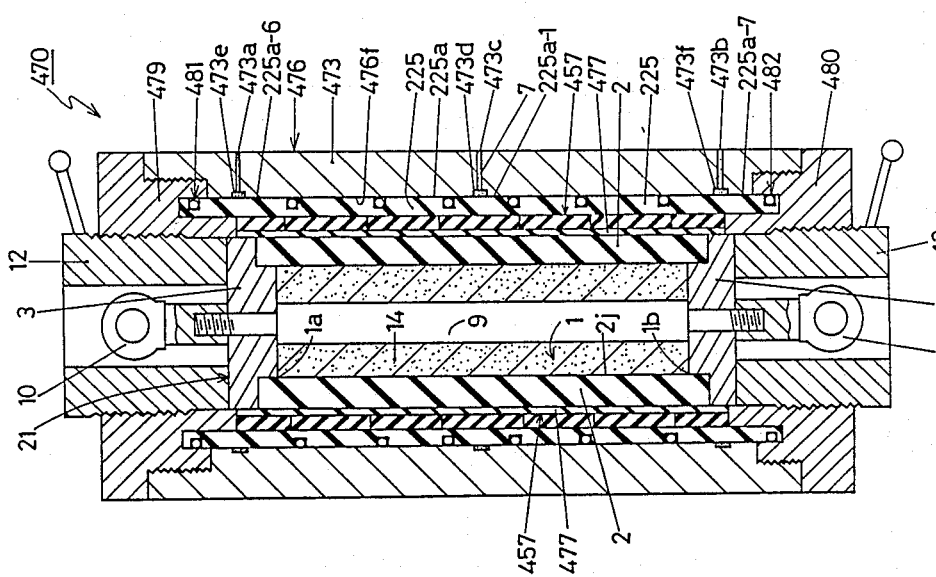
FIG. 36 is a longitudinal cross-sectional view of a dry-type rubber pressing apparatus according to a twelfth embodiment of the present invention.

FIG. 36 shows an apparatus 470 according to a twelfth embodiment of the present invention. The apparatus 470 differs from the apparatus 440, of the eleventh embodiment (FIGS. 30 and 34) with respect to the structure of a retainer case 476, seal structures 481, 482 near the upper and lower ends of the pressure tube 225, and in that a protective tube 477 is interposed between the backup tube 457 and the mold 2.

The protective tube 477 is made of a flexible material such as neoprene rubber, urethane resin, or the like. The protective tube 477 protects the backup tube 457 by holding the backup tube 457 out of contact with the lids 3, 4 of the pressed assembly 21.

The retainer case 476 comprises a rigid outer tube 473 and two lids 479, 480 threaded in upper and lower openings, respectively, of the outer tube 47. The pressure tube 225 is fitted in the retainer case 476 which has a liquid guide surface 476f defined on the outer tube 473 in confronting relation to the outer peripheral surface 225a of the pressure tube 225. The liquid guide surface 476f has an annular distribution groove 473d confronting the intial pressurizing region 225a-1 of the pressure tube 225, an annular distribution groove 473e confronting the upper pressurizing region 225a-6, and an annular distribution groove 473f confronting the lower pressurizing region 225a-7. The outer tube 473 has liquid supply and discharge ports 473c, 473a, 473b defined therein and communicating respectively with the annular distribution grooves 473d, 473e, 473f. After the pressurizing liquid 7 fills the space between the liquid guide surface 476f and the pressure tube 225, it is supplied from the central liquid supply and discharge port 473c and discharged from the upper and lower liquid supply and discharge ports 473a, 473b to remove air completely.

The seal structures 481, 482 near the upper and lower ends of the pressure tube 225 are identical to the seal structures 81, 82 of the third embodiment (FIGS. 7 and 8), the seal structure 91 (FIGS. 9(A) and 9(B)), or the seal structure 101 (FIGS. 10(A) and 10(B)).

(13TH EMBODIMENT)

Figure 37:
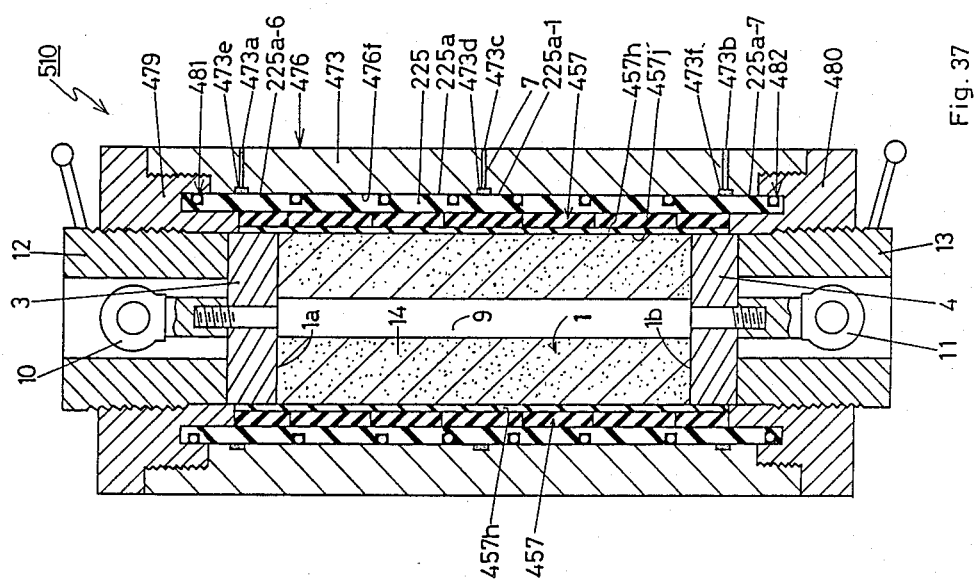
FIG. 37 is a longitudinal cross-sectional view of a dry-type rubber pressing apparatus according to a thirteenth embodiment of the present invention.

FIG. 37 shows an apparatus 510 according to a thirteenth embodiment of the present invention. The apparatus 510 is different from the apparatus 470 (FIG. 36) of the twelfth embodiment in that a mold and a protective tube are not provided, and the inner surface 457j of an inner layer 457h of the backup tube 457 serves as a powder compacting surface.

(14TH EMBODIMENT)

Figure 39:
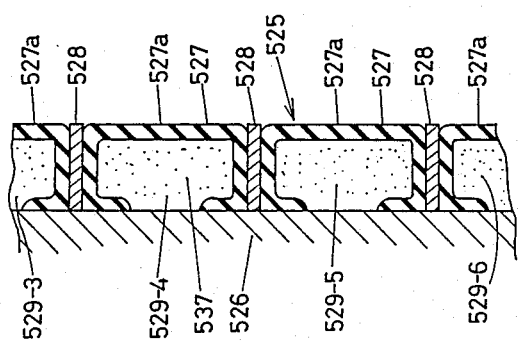
FIG. 39 is an enlarged fragmentary longitudinal cross-sectional view of a pressure chamber in the apparatus of FIG. 38.
Figure 38:
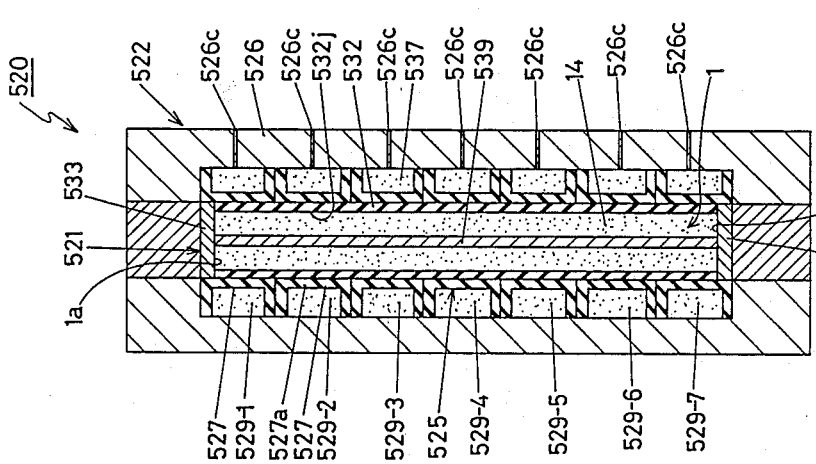
FIG. 38 is a longitudinal cross-sectional view of a dry-type rubber pressing apparatus according to a fourteenth embodiment of the present invention.
Figure 41:
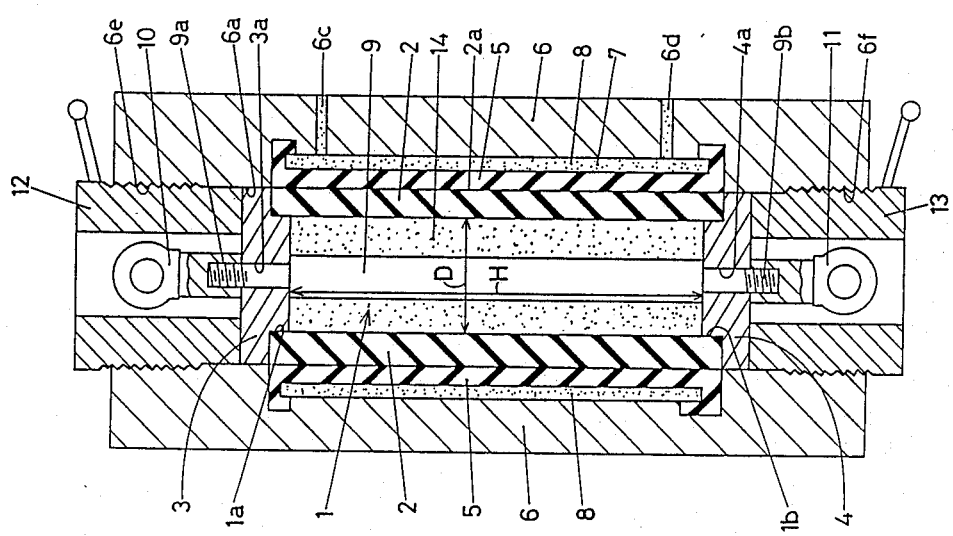
FIG. 41 is a longitudinal cross-sectional view of a conventional dry-type rubber pressing apparatus.

FIGS. 38 and 39 illustrate an apparatus 520 according to a fourteenth embodiment of the present invention. The apparatus 520 comprises a pressed assembly 521 and a pressing assembly 522.

As shown in FIG. 38, the pressing assembly 522 comprises a flexible pressure tube 525 disposed in a retainer case 526. The pressure tube 525 is composed of seven independent short tubes 527 which are axially coupled. The short tubes 527 have annular pressure chambers 529-1, 529-2, . . . , 529-7 defined around their respective tube walls 527a. As shown in FIG. 39, a partition 528 projecting from the inner peripheral surface of the retainer case 526 may be interposed between adjacent short tubes 527 for preventing the pressure in a pressure chamber from being transmitted into adjacent pressure chambers. The retainer case 526 has fluid supply ports 526c defined therein at radial positions corresponding to the pressure chambers 529-1, 529-2, . . . , 529-3, respectively. At least one fluid supply port is associated with each of the pressure chambers. The pressure tube 525 is not limited to the illustrated structure of coupled independent short tubes 527, but may have a unitary construction having a plurality of annular pressure chambers defined around a tube wall.

The pressed assembly 521 comprises a flexible mold 532 with a powder filling space 1 defined therein, a pair of lids 533, 534 closing upper and lower open ends 1a, 1b, respectively, of the powder filling space 1, and a core 539 extending between the upper and lower lids 533, 534, if desired.

The operation of the apparatus 520, or a method according to the present invention, will be described hereinbelow. The pressed assembly 521 is provided with powder 14 in the powder filling space 1. The pressed assembly is then inserted into the pressure tube 525 of the pressing assembly 522, and pressurized by a pressurizing fluid 537 introduced into the pressure chambers 529-1, 529-2, . . . , 529-7.

Figure 40:
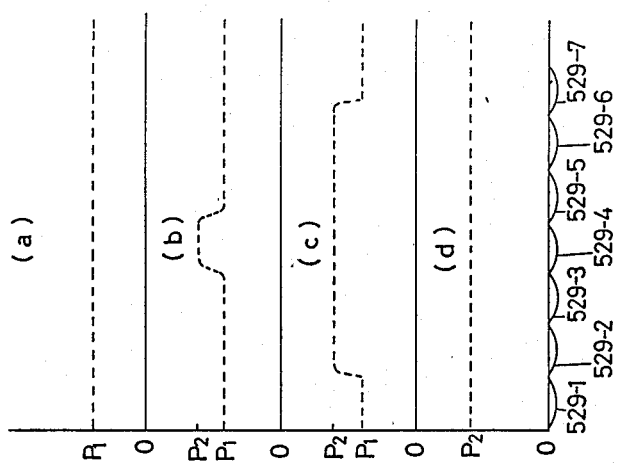
FIG. 40 is a graph showing the application of a maximum forming pressure.

The pressurizing process will be described in detail with reference to FIG. 40. The pressurizing fluid such as air, oil, glycerin, or the like is introduced into the pressure chambers 529-1, 529-2, . . . , 529-7 under a low initial pressure P1 in the range of 1 to 10 kg/cm$^2$, for example (see FIG. 40 at (a)), and the pressurizing fluid 537 is kept under such a low pressure for a suitable period of time. Then, the pressurizing fluid 537 under a maximum pressure P2 (see FIG. 40 at (b)) in the range of 15 to 30 kg/cm$^2$, for example, is introduced into the central pressure chamber 529-4, and the pressurizing fluid 537 in the pressure chamber 529-4 is maintained in this state for a suitable period of time. Then, the pressurizing fluid 537 under the maximum pressure P2 is introduced into the pressure chambers 529-3, 529-5 and the pressurizing fluid 537 in the pressure chambers 529-3, 529-5 is maintained in this state for a suitable period of time. In this manner, the pressurizing fluid 537 under the maximum pressure is progressively introduced toward the pressure chambers 529-1, 529-7 at the upper and lower ends (see FIG. 40 at (c) and (d)). The progressive introduction of the maximum fluid pressure serves to squeeze air in the powder 14 from the central region of the powder filling space 1 toward the upper and lower ends 1a, 1b thereof. After the maximum fluid pressure P2 has been supplied to the pressure chambers 529-1, 529-7 at the upper and lower ends, the maximum fluid pressure P2 is maintained for an appropriate period of time. Thereafter, the fluid pressure is removed from the pressure chambers 529-1, 529-2, . . . , 529-7. Finally, the pressed assembly 521 is taken out of the pressing assembly 522, and a formed product (not shown), the core 539, and the mold 532 are separated from each other.

The pressurizing process is not limited to the above-described pattern, but may be modified depending on the three-dimensional shape of a product to be formed, as follows:

Only one pressure chamber into which the maximum fluid pressure P2 is to be introduced first is selected from the pressure chambers 529-1, 529-2, . . . , 529-7. The maximum fluid pressure is progressively introduced toward the pressure chamber 529-1 and/or the pressure chamber 529-7 positioned at the end.

The initial compaction of the powder may be effected by a two-step pressurization process involving pressurization under a relatively low fluid pressure and pressurization under a relatively high fluid pressure.

The initial compaction of the powder may be carried out by first introducing the initial fluid pressure P1 into a selected one of the pressure chambers 529-1, 529-2, . . . , 529-7, and then progressively applying the fluid pressure toward the the pressure chamber 529-1 and/or pressure chamber 529-7 positioned at the end. In this case, the powder compaction under the maximum fluid pressure P2 may be effected by pressurizing all of the pressure chambers at the same time.

Further, the initial compaction under the initial low fluid pressure P1 may be omitted, and the powder may be compacted by progressively applying only the maximum fluid pressure P2.

(OTHER EMBODIMENTS)

In the aforesaid embodiments, the inner peripheral surface 2j of the mold 2 (FIG. 1), the inner peripheral surface 121j of the mold 121 (FIG. 13), the inner peripheral surface 532j of the mold 532 (FIG. 38), the inner peripheral surface 117j of the pressure tube 117 (FIG. 11), the inner peripheral surface 245j of the pressure tube 245 (FIG. 19), the inner peripheral surface 325'j of the pressure tube 325' (FIG. 29), and the inner peripheral surface 457j of the backup tube 457 (FIG. 37), which serve as powder compacting surfaces, are cylindrical surfaces for producing hollow or solid cylindrical products. However, the shape of a product that can be produced by the apparatus of the invention is not limited to a cylindrical shape. Instead, inner surfaces having various shapes may be employed as powder compacting surfaces to form products having three-dimensional shapes. Moreover, in the above-described embodiments, the pressure tube 25 (FIG. 1), the pressure tube 75 (FIG. 7), the pressure tube 117 (FIG. 11), and the pressure tube 127 (FIG. 13) have a cylindrical shape. However, the outer surfaces of the pressure tubes are not limited to being cylindrical shape, but may have various configurations to generate pressurizing forces sufficient to form products having three-dimensional shapes.

The present invention offers the following advantages:

(1) Since air in a mass of powder filled in a powder filling space can be squeezed toward the ends of the powder filling space where the air does not adversely affect a formed product, no compressed air will be trapped in the powder.

(2) Inasmuch as the powder and air can be completely separated from each other, the formed product is not damaged when it is removed from the mold.

(3) In an experiment conducted by the inventor, ceramic powder was compacted by the apparatus of the invention to form a hollow product having an outside diameter of 300 mm, an inside diameter of 240 mm, and a length of 4,000 mm. The experiment clearly indicates that the apparatus of the present invention is capable of producing elongate products which have not been possible heretofore.

Although certain preferred embodiments have been shown and described, it should be understood that many changes and modifications may be made therein without departing from the scope of the appended claims.

We claim:

1. A method of pressure-molding powder disposed in a powder filling space defined in a flexible pressure membrane, the flexible pressure membrane having a wall including a pressure bearing surface disposed exteriorly of the powder filling space, and the powder filling space having at least one end portion, said method comprising:

initially subjecting a local portion of the flexible membrane at the pressure bearing surface thereof to fluid under pressure sufficient enough to effect a curved deformation of said flexible membrane extending toward said powder filling space at said local portion thereof thereby squeezing a portion of the powder disposed in the powder filling space at said curved local deformation; and further subjecting the flexible membrane at the pressure bearing surface thereof to fluid under pressure to contiguously increase the curved deformation of the flexible membrane toward the powder filling space from said local portion to the at least one end portion of the powder filling space thereby progressively squeezing the remainder of the powder disposed in said powder filling space from a location adjacent said curved deformation to a location at each said end portion of the powder filling space.

2. A method of pressure-molding powder disposed in a powder filling space defined in a flexible pressure membrane, the flexible pressure membrane having a wall including a pressure bearing surface disposed exteriorly of the powder filling space, and the powder filling space having at least one end portion, said method comprising:

initially subjecting a local portion of the flexible membrane at the pressure bearing surface thereof to fluid under an initial pressure sufficient enough to effect a curved deformation of said flexible membrane extending toward said powder filling space at said local portion thereof thereby squeezing a portion of the powder disposed in the powder filling space at said curved local deformation;

continuously subjecting the flexible membrane at the pressure bearing surface thereof to the fluid under said initial pressure to contiguously increase the curved deformation of the flexible membrane toward the powder filling space from said local portion to the at least one end portion of the powder filling space thereby progressively squeezing the remainder of the powder disposed in said powder filling space from a location adjacent said curved deformation to a location at each said at least one end portion of the powder filling space; and subsequently simultaneously subjecting the flexible membrane at the entire pressure bearing surface thereof to fluid under a second pressure higher than said initial pressure to further squeeze the powder disposed in the powder filling space.

3. A method as claimed in claim 2, wherein said steps of initially and continuously subjecting the flexible membrane to fluid under pressure comprise subjecting the flexible membrane to fluid under pressure in the range of 50 to 100 kg/cm$^2$, and said step of subsequently subjecting the flexible membrane to fluid under a second pressure comprises subjecting the flexible membrane to fluid under pressure in the range of 500 to 5000 kg/cm$^2$.

* * * * *